United States Patent
Kurashige

[11] Patent Number: 6,124,896
[45] Date of Patent: Sep. 26, 2000

[54] CORNER DETECTION DEVICE AND CORNER DETECTION METHOD

[75] Inventor: Masafumi Kurashige, Kanagawa, Japan

[73] Assignee: Sony Corporation, Tokyo, Japan

[21] Appl. No.: 09/025,666

[22] Filed: Feb. 18, 1998

[30] Foreign Application Priority Data

Feb. 20, 1997 [JP] Japan ................................ 9-036107

[51] Int. Cl.$^7$ ................................................ H04N 9/75
[52] U.S. Cl. .................... 348/584; 348/722; 348/586; 348/590; 348/592
[58] Field of Search ..................... 348/722, 584, 348/586, 589, 590, 592, 587, 578, 580, 581; 345/419; 358/22, 450, 465, 464; 382/175; H04N 9/75

[56] References Cited

U.S. PATENT DOCUMENTS

| | | | |
|---|---|---|---|
| 4,242,734 | 12/1980 | Deal | 364/515 |
| 4,951,040 | 8/1990 | McNeil et al. | 340/729 |
| 5,107,252 | 4/1992 | Traynar et al. | 340/712 |
| 5,121,210 | 6/1992 | Hirayama | 358/183 |
| 5,488,675 | 1/1996 | Hanna | 348/589 |
| 5,491,517 | 2/1996 | Kreitman et al. | 348/581 |
| 5,566,251 | 10/1996 | Hanna et al. | 348/590 |
| 5,581,377 | 12/1996 | Shimizu et al. | 358/450 |
| 5,621,428 | 4/1997 | King et al. | 348/592 |
| 5,748,192 | 5/1998 | Lindholm | 345/425 |
| 5,761,339 | 6/1998 | Ikeshoji et al. | 382/176 |
| 5,793,340 | 8/1998 | Morita et al. | 345/7 |
| 5,982,921 | 11/1999 | Alumot et al. | 382/145 |
| 5,982,951 | 11/1999 | Katayama et al. | 348/584 |
| 6,020,932 | 2/2000 | Kurashige et al. | 348/584 |

*Primary Examiner*—John K. Peng
*Assistant Examiner*—Jean W. Désir
*Attorney, Agent, or Firm*—Frommer Lawrence & Haug, LLP; William S. Frommer

[57] ABSTRACT

A corner detector capable of detecting each corner position of a predetermined area from an input signal with a simple structure. There is provided memory means (9B) for storing memorizing an input signal (keyT) and corner detection means (9C) for detecting a point where the signal level becomes the reference signal level or more at first by reading an input signal stored in the memory means sequentially in horizontal direction from an upper limit and a lower limit of a retrieval scope and in vertical direction from the left end to the right end of the retrieval scope, and detecting a point where the signal level becomes the reference signal level or more at first by reading an input signal stored in the memory means sequentially in a diagonal direction at a predetermined angle from each angle of the retrieval scope to detect from the detected points four points whose positions differ. With such means, each corner position of the area of the detection object can be detected with a simple structure and quickly.

21 Claims, 22 Drawing Sheets

CORNER DETECTION DEVICE AND CORNER DETECTION METHOD

BACKGROUND OF THE INVENTION

1. Field of the Invention

The present invention relates to a corner detection device and a corner detection method, and a device and a method which are preferably applied to a video signal processing device wherein an image of another video signal is inserted in a predetermined frame of a background of a news anchorperson by photographing the anchorperson who reads news to generate the video signal and inserting the other video signal therein.

2. Description of the Related Art

Conventionally, in the manufacture of news programs, an image corresponding to the content of news is provided to viewers by inserting a video image corresponding to news content read by an anchorperson into a predetermined frame of the background of an anchorperson. As a consequence, viewers can understand the content of the news further in detail with the news manuscript read by the anchorperson and the video image presented at the background of the anchorperson.

The insertion processing of video signals is performed with a method which will be explained hereinbelow. At first, a source video signal representative of a video image (referred to as a source video image hereinafter) which should be inserted in a predetermined frame of the background of the anchorperson is generated (or reproduced from a VCR or the like) and is input to one input terminal of a mixer via a video effector. Furthermore, along with this, a studio video image signal is obtained by photographing the anchorperson in the studio, and the studio video signal is input to the other input terminal of the mixer. This mixer mixes a source video signal input to one and the other input terminals and the studio video signal, and a synthesized video signal obtained as a consequence is supplied to a monitor.

An operator supplies a parameter for expanding, reducing, moving, and rotating a source video image to a video effector via an input device such as a track ball or the like in such a manner that an outside form of the source video image corresponds to a predetermined frame of the background of the anchorperson while watching the synthesized image displayed on the monitor. The video effector expands, reduces, moves, and rotates the source video image on the basis of the parameter which is supplied and supplies to the mixer the source video signal which is subjected to the aforementioned processing, and a key signal representative of the configuration of the source video image after the aforementioned processing is performed. The mixer inserts the source video signal into a position represented on the basis of the key signal from out of the studio video signal. The synthesized video signal which is obtained as a consequence is supplied to the monitor to be displayed as described above. The operator supplies parameters for expansion, reduction, movement, and rotation to a video effecter in a repeated manner while watching the synthesized image which is displayed until an outside configuration of the source video image agrees with the predetermined frame of the background of the anchorperson. When such processing is repeated, the video source image is inserted into the predetermined frame of the background of the anchorperson in the conventional example.

Incidentally, in the conventional insertion processing, the operator must input parameters required for conversion processing such as expansion, reduction, movement, and rotation of the source video image until the configuration of the source video image agrees with the predetermined frame of the background of the anchorperson in a manual operation by using an input device such as a track ball or the like. As a consequence, a problem arises in that it takes a long time to get the source image configuration to agree with the predetermined frame of the background of the anchorperson accurately, and the operation becomes troublesome because a parameters input operation must be performed.

As a method for solving the problem, for example, U.S. Pat. No. 4,951,040 and U.S. Pat. No. 5,107,252 discloses such a method. In such a method, the operator uses input means such as a touch tablet, and a stylus or the like to input the corner position of at least four points representing a configuration after the conversion of the source video image. Then, the image conversion means converts the source video image on the basis of an address signal representing the corner position of four points which are input in such a manner that the corner of the source video image agrees with the corner of the designated four points. As a consequence, in this method, the source video image can be inserted into a predetermined frame in a relatively short time compared to the method described above, and the operation of the operator can be eased.

However, in these methods, in a case in which the source video image is inserted into the predetermined frame of the background of the anchorperson, the operator must input the corner position by manually operating input means such as a touch tablet, a stylus, and the like so that each corner of the source video image agrees with each corner of the predetermined frame of the background of the anchorperson with the result that the method is still insufficient in making the operation of the operator easy.

Incidentally, when the four corner positions of the predetermined frame located at the background of the anchorperson can be automatically detected from the studio video signal, the parameter of the image conversion is determined on the basis of the corner position. Thus, it seems that a video signal processing device can be realized which is capable of automatically inserting the source video image into the predetermined frame of the background of the anchorperson. In such a video signal processing device, the operation of the operator can be eased to a considerable degree, compared to the prior art, so that it seems that the condition of usage can be improved.

SUMMARY OF THE INVENTION

In view of the foregoing, an object of the present invention is to provide, using a simple structure, a corner detection device and a corner detection method which is capable of detecting each corner position of the predetermined area from the input signal.

The foregoing object and other objects of the invention have been achieved by the provision of a corner detection device for detecting from a retrieval scope of an input signal each corner position of an area of a square configuration where a signal level is set to a level higher than a level of a reference signal level, the device comprising: memory means for memorizing the input signal; and corner detection means for detecting that the signal level of the input signal is at first set to a level higher than the level of the reference signal by reading from the retrieval scope upper and lower limits in a horizontal direction sequentially the input signal which is memorized in the memory means, and at the same time reading from the retrieval scope left and the right ends in a vertical direction sequentially, and detecting that the signal level of the input signal is at first set to a level higher than the level of the reference signal by reading the input signal memorized in the memory means in a diagonal direction sequentially at a predetermined angle from each angle, and detecting four points whose positions differ out of the detected points.

In this manner, a point which is set to a level higher than the level of the reference signal level is detected by reading the input signal in the horizontal direction and in the vertical direction, and a point which is set to a level higher than the level of the reference signal is detected by reading the input signal in the diagonal direction at a predetermined angle, and each corner position of an area of a detection object can be detected in a short time with a simple configuration by detecting the corner position by detecting four points whose positions differ from the detected points.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 1:
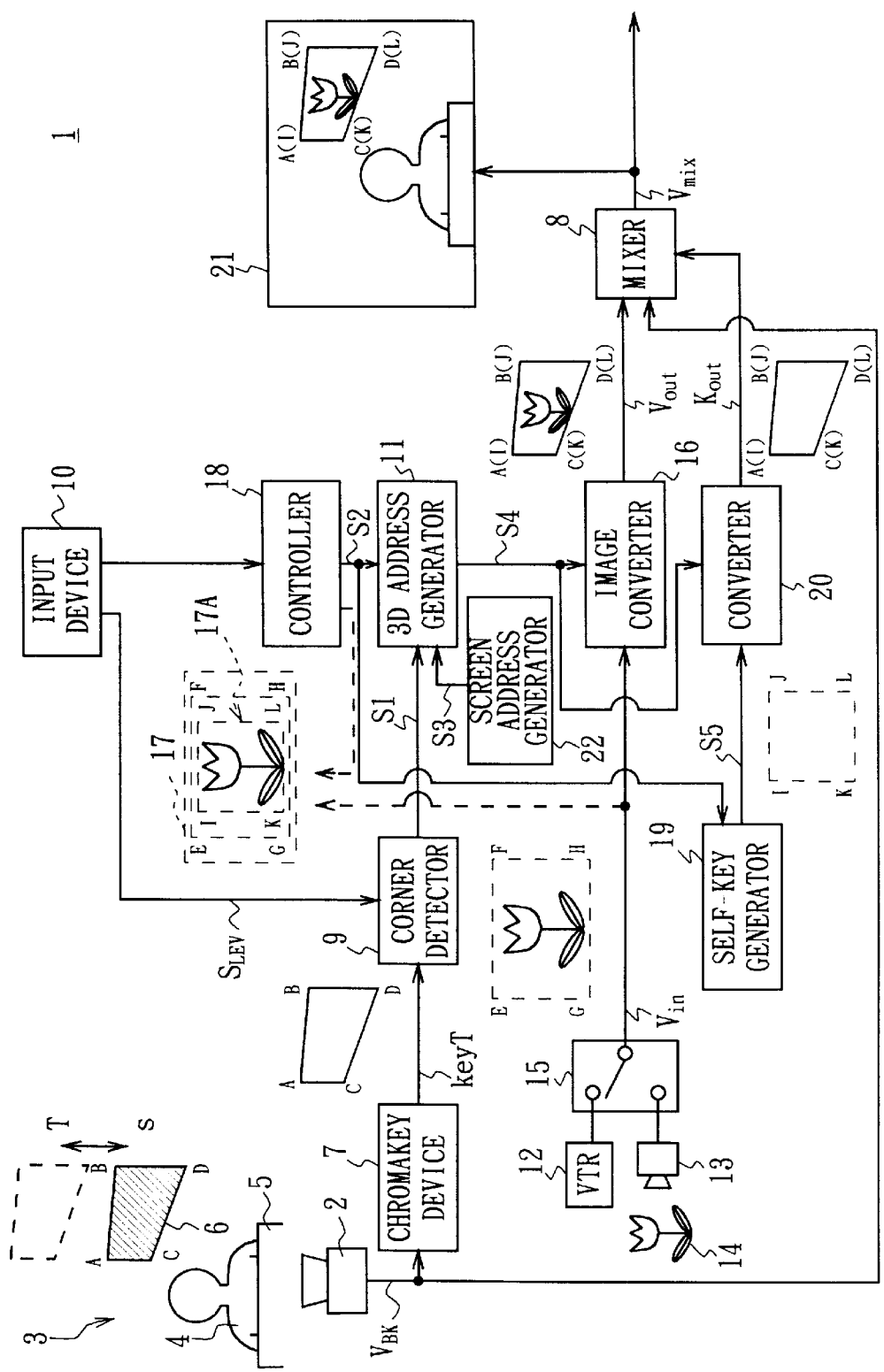
FIG. 1 is a block diagram showing an overall structure of a video signal processing device according to one embodiment of the present invention.

Preferred embodiment of the present invention will be described with reference to the accompanying drawings:
(1) Overall Structure In FIG. 1, reference numeral 1 denotes a video signal processing device which is applied to the present invention as a whole. The device is constituted in such a manner that the studio video signal is generated by photographing a studio 3 with a video camera 2. In this case, an anchorperson 4 is situated so that the anchorperson reads a manuscript of news at a position adjacent to a table 5 placed in the studio 3. Furthermore, at a position diagonally to the rear of the anchorperson 4, a blue plate 6 of a square ABCD having a blue color tone is diagonally arranged in a backward direction. This blue plate 6 is arranged to represent an insertion position of the source video image, and a source video image is inserted as a position of this blue plate 6 with the image synthesis which will be described later. For reference, in a case in which the source video image is not inserted, the blue plate 6 is moved to a position T which does not enter into the photograph scope of the video camera 2. Incidentally, at the rear of the anchorperson 4 and the blue plate 6 is provided a wall of the studio 3 whose color is selected as a color tone other than blue so that this blue plate can be easily recognized.

The studio 3 which is set in this manner is photographed with a digital video camera 2 having a CCD as a photograph device. At this time, the video camera 2 is such that the anchorperson is placed in the center of the image and the studio 3 is photographed in such a manner that the blue plate 6 and the table 5 are housed in the image. A digital image signal which is output with this video camera 2 is supplied to a chromakey device 7 as a studio video signal $V_{BK}$ and is supplied to one input terminal of the mixer 8.

Figure 2A:
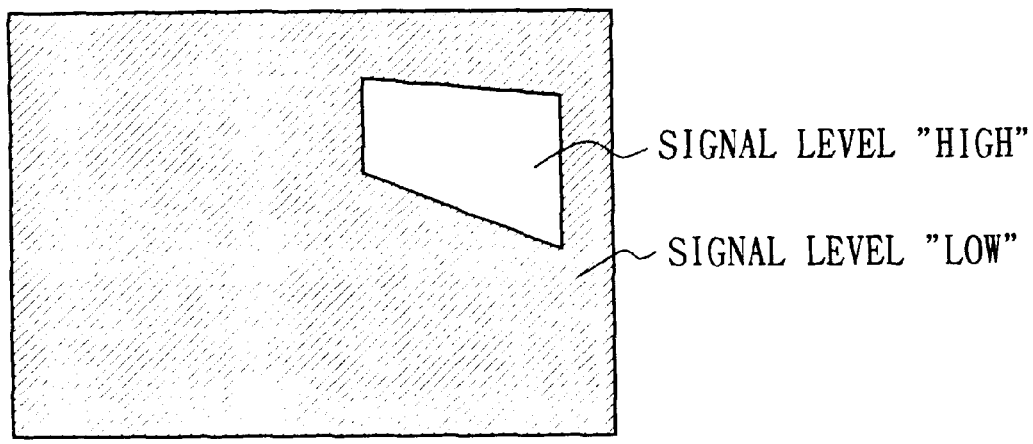
FIGS. 2A and 2B are schematic views showing images of a target key signal keyT and the studio video signal $V_{BK}$.
Figure 2B:
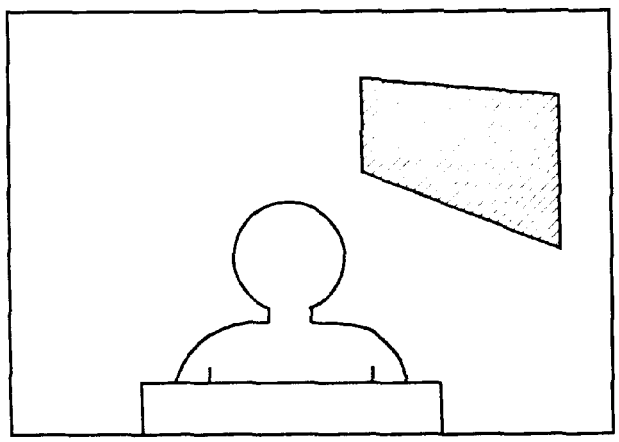

The chromakey device 7 detects from the supplied studio video signal $V_{BK}$ an image signal whose tone is blue, and the detection result is output as a target key signal KeyT. This target key signal KeyT is a 10-bit digital signal, and the signal level of the target key signal KeyT which is represented in the digital signal is set to a level corresponding to the color tone of the studio video signal $V_{BK}$. In other words, in the area of the video signal whose color tone, is blue the signal level of the target key signal KeyT becomes high. In the area of the video signal whose color tone is other than blue, the signal level of the target key signal keyT becomes low. Consequently, the configuration of an area where the signal level is set to "high" agrees with the configuration of the blue plate 6. As shown in FIG. 2A, the configuration becomes a square ABCD having the same configuration as the blue plate 6. Furthermore, the area where the signal level is set to "high" agrees with the position of the blue plate 6 in the studio video signal $V_{BK}$. Incidentally, for reference, FIG. 2B shows the studio video signal. In this manner, the target key signal KeyT showing the configuration and the position of the blue plate 6 is supplied to the subsequent corner detector 9.

The corner detector 9 uses a volume for the reference level provided on the input device 10 to receive the reference signal level $S_{LEV}$ input by the operator from the input device 10 and compares the reference signal level $S_{LEV}$ with the signal level of the target key signal KeyT supplied from the chromakey device 7. Then, the corner detector 9 detects an area of the blue plate 6 by detecting an area in which the signal level of the target key signal KeyT is higher than the reference signal level $S_{LEV}$ and the detector generates an address signal S1 showing the four corner positions by detecting the position in the display coordinate of the four corner positions of the area. This address signal S1 is supplied to the subsequent three-dimensional conversion address generator 11. Incidentally, the display coordinate in which is described here refers to a coordinate where a horizontal direction of a monitor screen is set to an X axis and a vertical direction is set to Y axis, and a plumb direction with respect to the monitor screen is set to the Z axis.

Furthermore, the source video signal which is inserted into a predetermined frame of the background of the anchorperson 4 is generated in the following two methods as explained below. The first method is a method for generating a source video signal by reproducing the video signal which is recorded in advance on magnetic tape with the video cassette recorder (VCR) 12. The second method is a method for generating the source video signal by using the video camera 13 having a CCD as a photograph device to photograph an object 14. Incidentally, here, the video cassette recorder 12 and the video camera 13 both adopt a digital system.

Output terminals of the video cassette recorder 12 and the video camera 13 are connected to one and the other input terminal of the changeover switch 15. As a consequence, when the operator changes over the changeover switch 15, the desired video signal out of the source video signals which are generated in the two method is selectively selected. The digital video signal selected with the changeover switch 15 is supplied to the image conversion device 16 as a source video signal $V_{in}$.

Incidentally, the source video signal $V_{in}$ is an image signal of a general color image system (for example, an NTSC system) having an effective image area EFGH in either case in which it is generated in the above two methods as shown in FIG. 1.

Here, this video signal processing device 1 is constituted so that the device 1 designates a desired image area out of the effective image area EFGH of the source video signal $V_{in}$ which is generated in this manner and inserts the desired area into the predetermined frame (ABCD) of the background of the anchorperson 4. The designation of this image area will be explained concretely in the following manner. However, in the foregoing explanation, the image area selected and designated by the operator will be referred to as a selected image area IJKL.

At first, the source video signal $V_{in}$ is supplied to the image converter 16 as described above. Furthermore, the source video signal $V_{in}$ is also supplied to the monitor 17. The monitor 17 displays this source video signal $V_{in}$ and displays an effective image area EFGH of the source video signal $V_{in}$ on the monitor screen.

To this monitor 17, a display control signal is supplied from a controller 18. On the basis of this display control signal, a recognition line 17A is displayed which shows an outer configuration of the selected image area IJKL so that the selected image area IJKL can be visually recognized on the screen of the monitor 17. The size of this recognition line 17A screen changes when the operator inputs scope designation information by using an area designation volume and keyboard of the input device 10, that is the controller 18 generates a display control signal corresponding to the area designation information and controls the size of the recognition line 17A by supplying the display control signal to the monitor 17. As a consequence, on the screen of the monitor 17, a recognition line 17A having a size designated by the operator is displayed. Consequently, the operator may operate the area designation volume and the keyboard of the input device 10 while watching the screen displayed on the monitor 17 so that the area which is desired to be inserted as the source video image is surrounded by the recognition line 17A.

Here, the area designation will be explained concretely. As described above, the operator operates the area designation volume and the keyboard of the input device 10 while watching the source video image displayed on the monitor 17, and inputs scope designation information as to which area out of the effective image area EFGH is selected as a selected image area IJKL. At this time, the operator inputs scope designation information in the horizontal direction and in the vertical direction on the basis of the center of the effective image area EFGH of the source video signal $V_{in}$. For example, when the operator inputs plus 80 percent and minus 80 percent from the center of the effective image area EFGH as scope designation information in the horizontal direction and inputs the plus 80 percent and the minus 80 percent of the effective image area EFGH as scope designation information in the horizontal direction, the recognition line 17A is displayed at a position shown in FIG. 3A. In other words, a vertical line of the recognition line 17A is displayed at a position shifted by plus 80 percent and minus 80 percent in the horizontal direction from the center of the effective image area EFGH while a horizontal line of the recognition line 17A is displayed at a position shifted by plus 80 percent and minus 80 percent in the vertical direction from the center of the effective image area EFGH. In this case, the image area which is surrounded by the recognition line 17A which is displayed in this manner is designated as the selected image area IJKL.

Figure 3A:
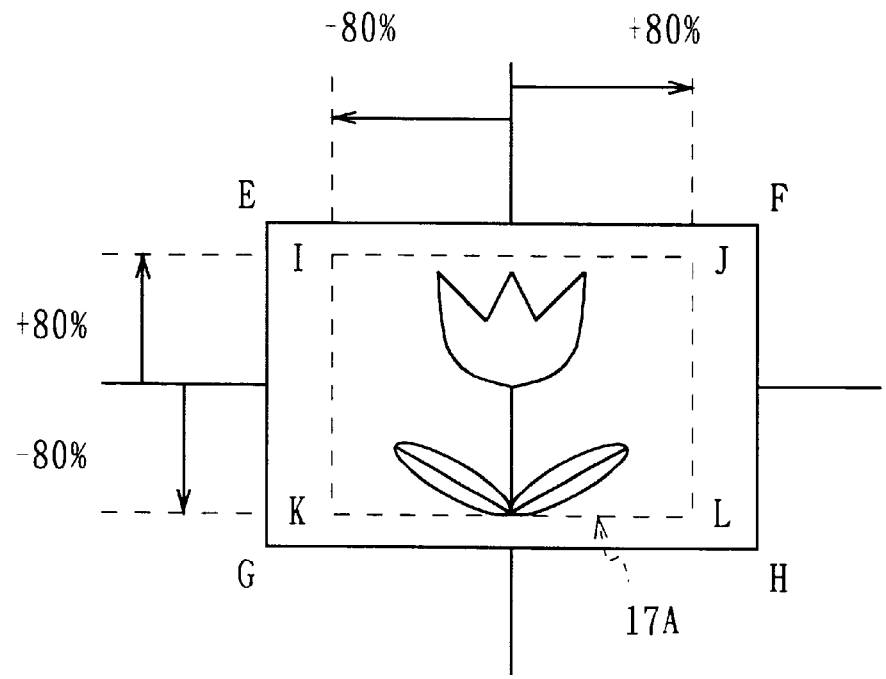
FIGS. 3A and 3B are schematic views which are supplied for explaining area designations of the selected image area.
Figure 3B:
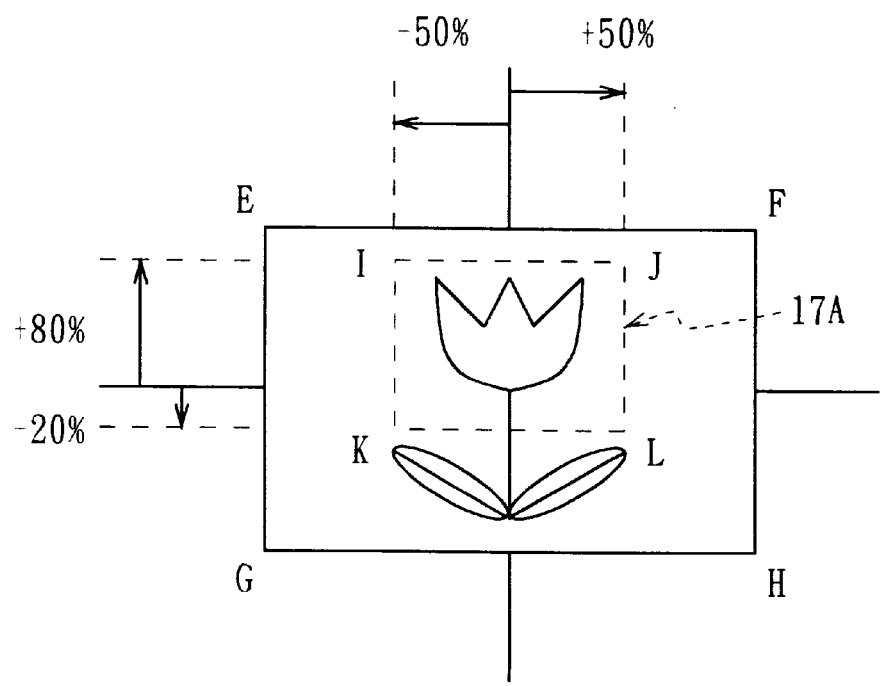

Furthermore, when the operator inputs plus 50 percent and minus 50 percent from the center of the effective image area EFGH as scope designation information in the horizontal direction, for example, and plus 80 percent and minus 20 percent from the center thereof as scope designation information in the vertical direction, the recognition line 17A is displayed at a position shown in FIG. 3B. In other words, the vertical line of the recognition line 17A is displayed at a position shifted by plus 50 percent and minus 50 percent from the center of the effective image area EFGH. The horizontal line of the recognition line 17A is displayed at a position shifted by plus 80 percent and minus 20 percent from the center of the effective image area EFGH. In this case, the image area which is surrounded by the recognition line 17A is designated as the selected image area IJKL.

Incidentally, when plus 100 percent and minus 100 percent from the center of the effective image area EFGH is input as scope designation information in the horizontal direction and plus 100 percent and minus 100 percent from the effective image area is input as the scope designation information in the vertical direction, the recognition line 17A is located at an outside periphery of the effective image area EFGH, as is apparent from FIGS. 3A and 3B. Thus, the effective image area EFGH itself is specified as the selected image area IJKL. For reference, as a default value of the recognition line 17A, both the horizontal direction and the vertical direction are set to plus 100 percent and minus 100 percent, and the effective image area EFGH is designated as the selected image area IJKL unless the operator operates the scope designation volume and the keyboard of the input device 10.

Here, the explanation returns to FIG. 1 and the explanation continues. With the termination of the designation of the selected image area IJKL by the operator, the controller 18 detects four corner positions on the basis of the scope designation information from the input device 10 and generates an address signal S2 showing the four positions in the display coordinate. Incidentally, as described above, when the operator does not designate the scope, an address signal S2 is generated which shows the four corner positions of the effective image area EFGH which is a default value. The address signal S2 is supplied to the their dimensional address generator 11 and the self-key generator 19. Incidentally, as is apparent from the explanation, the controller 18 constitutes a source corner designation circuit which designates each corner position of the image area to be inserted into the studio video signal $V_{BK}$ to the three-dimensional conversion address generator 11 which will be described later.

The address signal S1 showing four corner positions of the square ABCD showing the blue plate 6 which signal is supplied from the corner detection device 9 as described above and the address signal S2 showing four corner positions of the selected image area IJKL which is supplied from the controller 18 are supplied to the three-dimensional conversion address generator 11. Furthermore, a screen address signal S3 which is generated by the screen address generator 22 is also supplied to the three-dimensional conversion address generator 11. This screen address signal S3 is a signal showing an address on the monitor screen of the monitor 21 which will be described later. The screen address generator 22 has, inside, a reference clock generator corresponding to an image pixel frequency to generate a screen address in the sequence of the raster scan of the monitor 21 on the basis of the reference clock generated in the reference clock generator and outputs the screen address as a screen address signal S3.

The three-dimensional conversion address generator 11 calculates a conversion address for converting the selected image area IJKL into the same configuration as the square ABCD on the basis of the address signal S1 showing the four corner positions the square ABCD showing the blue plate 6 supplied from the corner detection device 9, and the address signal S2 showing the four corner positions of the selected image area IJKL supplied from the controller 18.

Concretely, the three-dimension address generator 11 calculates a conversion matrix for allowing a selected image area IJKL subjected to natural perspective conversion processing (known as perspective processing) to be inserted into a square ABCD on the basis of an address signal S1 showing the four corner positions of the square ABCD and an address signal S2 showing the four corner positions of the selected image area IJKL. Next, the three-dimensional conversion address generator 11 calculates a reverse line of the conversion matrix, and calculates the conversion address by subsequently multiplying the reverse line with a screen address obtained by a screen address signal S3. This conversion address is supplied to an image converter 16 as a conversion address signal S4.

The image converter 16 comprises a field memory and a source video signal $V_{in}$ to be input is subsequently written to the field memory. Furthermore, the image converter 16 reads a source video signal $V_{in}$ from a position in the field memory instructed by the conversion address signal S4 supplied from the three-dimensional conversion address generator 11 to generate a source video signal $V_{out}$ in which the selected image area IJKL as a source video image is converted to the square ABCD having the same configuration as the blue plate 6. Incidentally, since the conversion address is generated on the basis of the screen address which is generated in the raster scan, the conversion address may designate a position which does not exist in the field memory. In such a case, the image converter 11 does not read the source video signal $V_{in}$.

Figure 4:
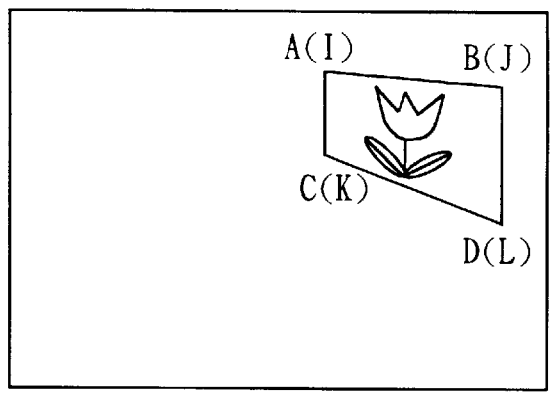
FIG. 4 is a schematic view showing an image of the source video signal $V_{out}$.

Thus, the source video signal $V_{out}$ which is generated in this manner is converted to the same configuration as the square ABCD where the selected image area IJKL which is the source video image shows the blue plate 6 as shown in FIG. 4, and at the same time, the source video signal is a video signal which is converted in the coordinate to the position of the square ABCD. Incidentally, as is apparent from FIG. 4, the correlative relationship between the selected image area EFGH and the square ABCD is such that the corners E, F, G, and H of the selected image area correspond to the corners A, B, C, and D of the square respectively.

The source video signal $V_{out}$ which is generated in this manner is supplied to the other input terminal of the subsequent mixer 8.

Figure 5:
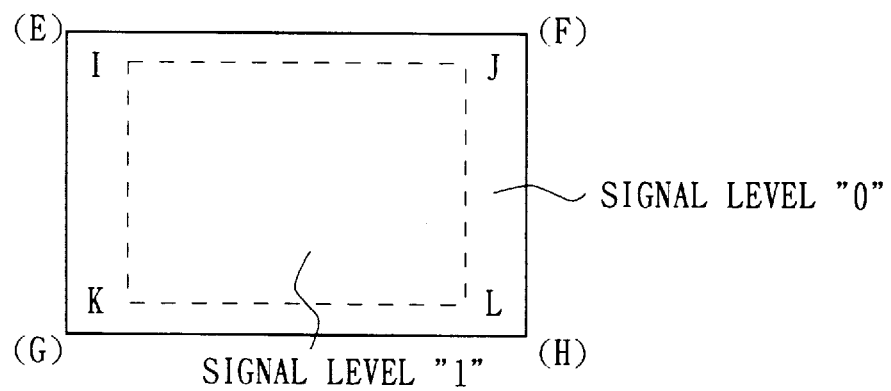
FIG. 5 is a schematic view showing an image of a self-key signal S5.

A self-key generator 19 generates, on the basis of the address signal S2 showing the four corner positions of the selected image area IJKL supplied from the controller 18, a self-key signal S5 wherein an area where the signal level is set to "1" is formed into the same configuration as the selected image area IJKL. Then, the self-key signal S5 is output to the converter 20 for the key signal. Incidentally, as is apparent from FIG. 5, the size of the whole area shown by the self-key signal S5 corresponds to the effective image area EFGH.

The converter 20 for the key signal basically has the same constitution as the image converter 16. The self-key signal to be input is subsequently written to the field memory. Furthermore, the converter 20 for the key signal generates a self-key signal $K_{out}$ in which the area where the signal level is set to "1" is converted to the square ABCD having the same configuration as the blue plate 6 by reading the self-key signal S5 from the position of the field memory designated by the conversion address signal S4 supplied from the three-dimensional conversion address generator 11. Incidentally, in the case of this converter 11, when the conversion address designates a position which does not exist in the field memory, an operation of reading the self-key signal S5 is not performed.

Figure 6:
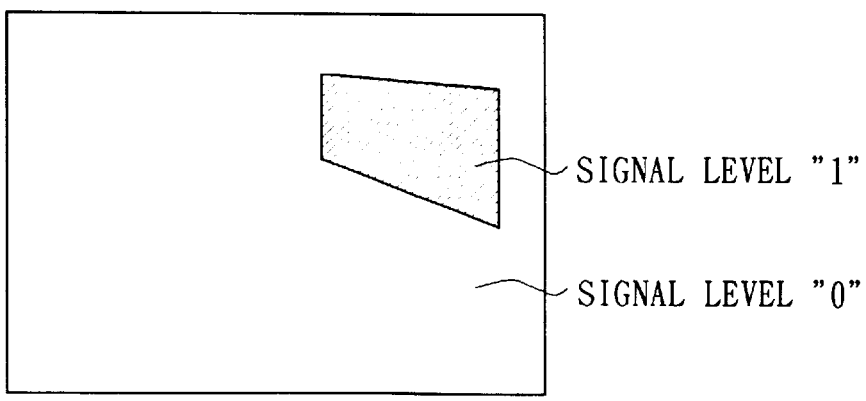
FIG. 6 is a schematic view showing an image of the self-key signal $K_{out}$.

Thus, the self-key signal $K_{out}$ which is generated in this manner is converted to the same configuration as the square ABCD where the area in which the signal level is set to "1" shows the blue plate 6 as shown in FIG. 6. At the same time, the self-key signal is a signal which is coordinately converted to the position of the square ABCD.

The self-key signal $K_{out}$ which is generated in this manner is supplied to the key input terminal of the subsequent mixer 8.

The mixer 8 synthesizes the source video signal $V_{out}$ supplied from the image converter 16 and the studio video signal $V_{BK}$ supplied from the video camera 2 on the basis of the self-key signal $K_{out}$ supplied to the key signal input terminal. In other words, the mixer 8 outputs the studio video signal $V_{BK}$ supplied from the video camera 2 when the signal level of the self-key signal $K_{out}$ is set to "0". When the signal level of the self-key signal $K_{out}$ is "1", the source video signal $V_{out}$ supplied from the image converter 16 is output. As a consequence, a synthesized video signal $V_{mix}$ where the source video signal $V_{out}$ is inserted into the area of the blue plate 6 of the studio video signal $V_{BK}$ is generated. This synthesized video signal $V_{mix}$ is supplied to outside broadcasting equipment and is supplied to the monitor 21.

When the synthesis video signal $V_{mix}$ which is generated in this manner is displayed on the monitor 21, the synthesized video screen is displayed as shown in FIG. 1 in which a source video image IJKL is inserted into the predetermined frame ABCD of the background of the anchorperson 4.

Figure 7:
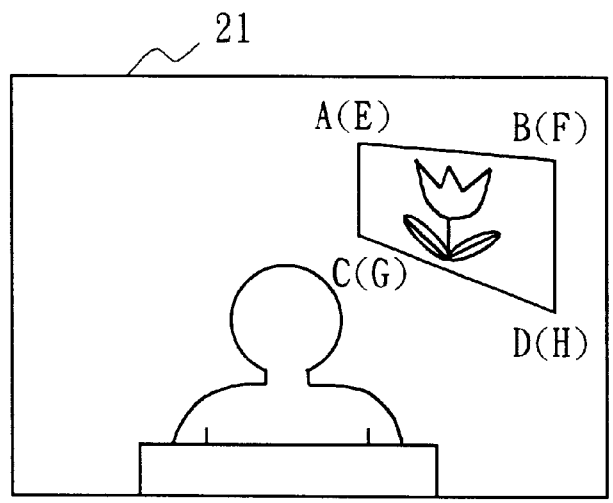
FIG. 7 is a schematic view showing an image of the synthesized video signal $V_{mix}$ when the whole of the effective image area EFGH is designated as the selected image area IJKL.

For reference, in a case in which the whole area of the effective image area EFGH is designated as the selected image area IJKL, a synthesized video screen is displayed in which the whole effective image area EFGH is inserted into the predetermined frame ABCD of the background of the anchorperson 4 as shown in FIG. 7.

Figure 8:
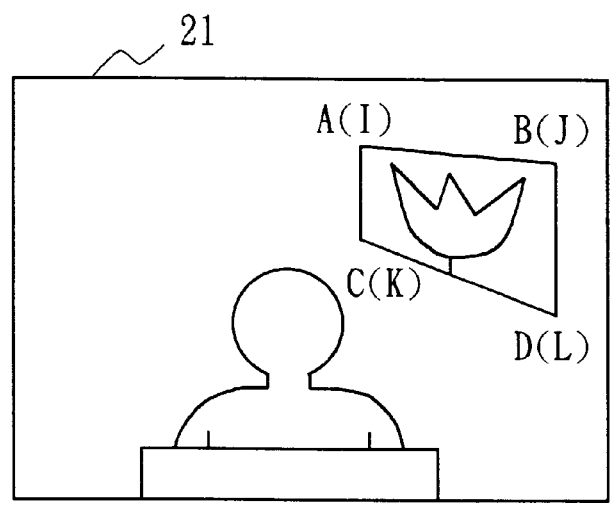
FIG. 8 is a schematic view showing an image of the synthesized video signal $V_{mix}$ when the whole of the effective image area EFGH is designated as the selected image area IJKL.

Furthermore, in a case in which only part of the effective image area EFGH, namely only the petal monition, is designated as the selected image area IJKL as shown in FIG. 3B, a synthesized video screen is displayed in which only the designated part is inserted into the predetermined frame ABCD of the background of the anchorperson 4. Incidentally, as is apparent from FIG. 8, in a case in which only part of the effective image area EFGH is designated, the designated part is enlarged and displayed.

(2) Image Converter Structure

Figure 9:
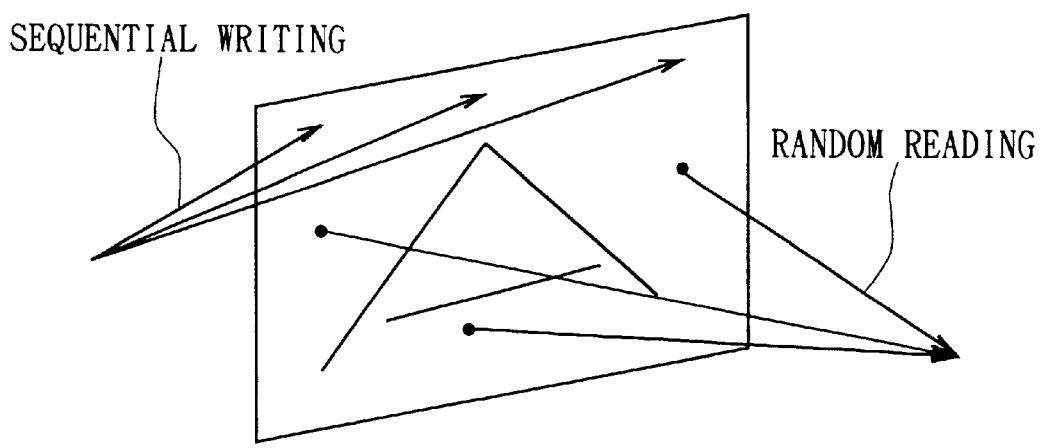
FIG. 9 is a block diagram showing a structure of an image converter.
Figure 9:
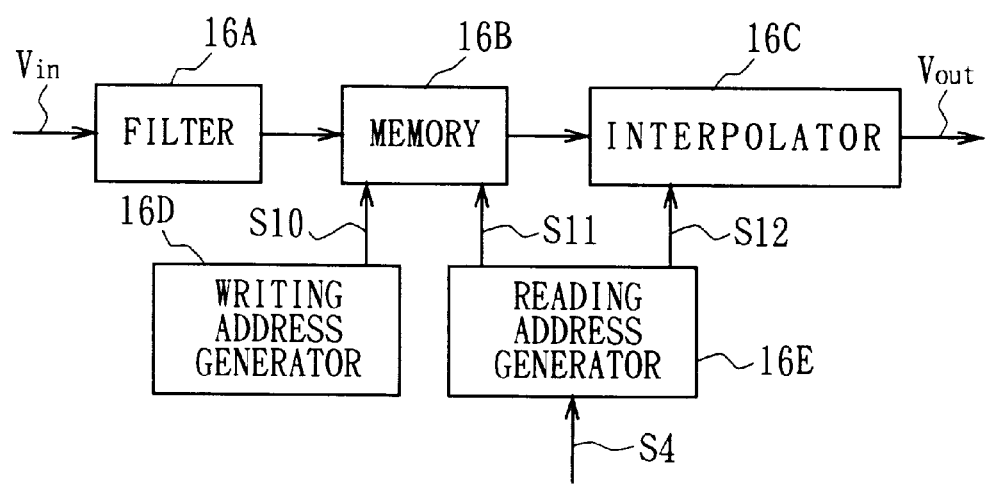

In this section, a concrete structure of the image converter 16 which is described above will be explained. As roughly shown in FIG. 9, the image converter 16 has a filter 16A, a memory 16B, an interpolator 16C, a writing address generator 16D, and a reading address generator 16E. A source video signal $V_{in}$ which is output from the changeover switch 15 is at first supplied to the filter 16A. This filter 16A is intended to suppress the generation of an aliening. A zone restriction in the vertical and the horizontal directions is set with respect to the source video signal $V_{in}$ to be input.

This memory 16B comprises three field memories. One field memory field out of the three field memories is limited to a writable state while the remaining two field memories are limited to a readable state. In this case, the field memories which are limited to the writable and readable states are subsequently shifted in the field cycle. For example, when the first field memory is limited to a writable state and the second and the third field memories are set to the readable state, the second field memory is set to the writable state in the next field so that the second field memory is limited to the writable state and the third and the first field memories are limited to the readable state at the timing of the next field. Furthermore, at the timing of the next field, the third field memory is limited to the writable state and the first and second field memories are limited to the readable state. Incidentally, the conversion processing which will be described later will be able to be performed in this manner in real time by the changeover of the writable state and the readable state of the three field memories from a field to another.

When the source video signal $V_{in}$ is input to such a memory 16B, the source video signal $V_{in}$ is subsequently written to the field memory which is set to the writable state on the basis of a sequential writable address signal S10 which is supplied from the writing address generator 16D. Incidentally, the writing address generator 16D has, inside, a reference clock generator corresponding to the pixel frequency of the source video signal $V_{in}$ with the result that a sequential address signal S10 is generated on the basis of the reference clock which is generated in the reference clock generator.

Furthermore, the memory 16B subsequently reads the source video signal $V_{in}$ from the two field memories which are set to the readable state on the basis of the reading address signal S11 supplied from the reading address generator 16E along with this writing operation. The source video signal which is thus read is supplied to the interpolator 16C which follows after this.

Here, the reading address generator 16E generates the reading address signal S11 on the basis of the conversion address signal S4 which is supplied from the three-dimensional conversion address generator 11. In this case, the reading address generator 16E fetches the integer number part of the conversion address which is obtained by the conversion address signal S4 as a reading address, and the reading address is supplied to the memory 16B as the reading address signal S11. Incidentally, in a case in which the fetched reading address is an address which does not exist in the memory 16B, the reading address signal S11 is not output so that the reading operation is suspended as described above.

Furthermore, the reading address generator 16E fetches a decimal part of the conversion address which is obtained with the conversion address signal S4 and generates the interpolation coefficient which is used in the interpolator 16C on the basis of the decimal part. This interpolation coefficient is supplied to the interpolator 16C as an interpolation coefficient signal S12.

The interpolator 16C performs an interpolation processing with respect to the source video signal which is read from the memory 16B, and the interpolator 16C subjects the source video signal which is read to interpolation processing on the basis of the interpolation coefficient which is obtained from the interpolation coefficient signal S12. Incidentally, the reason why the interpolator 16C is provided in this manner is described as follows. The conversion address which is supplied from the three-dimensional conversion address generator 11 is not necessarily given in integer numbers, and the number may include the decimal. When the conversion address includes the decimal, the address of the decimal does not exist in the memory 16B and the reading operation cannot be performed. Consequently, the conversion address is divided into an integer number part and a decimal number part. When the conversion address includes the decimal, the video data which is read with the integer number part is interpolated so that video data corresponding to the decimal part is obtained. Consequently, even when the conversion address includes the decimal, it becomes possible to obtain the video data corresponding to the conversion address.

Thus, the source video signal is read from the memory 16B corresponding to the integer part of the conversion address, and at the same time, the source video image which is read corresponding to the decimal part of the conversion address is interpolated so that the part of the source video signal is converted to the same configuration as the square ABCD showing the blue plate 6 as shown in FIG. 4 and, at the same time, the source video signal $V_{out}$ which is coordinate converted to the position of the square ABCD is generated. This source video signal $V_{out}$ is supplied to the mixer 8 as described above.

For reference, it has been explained that the filter 16A, the memory 16B, and the interpolator 16C constitute one set. However, in actuality, two sets of filters 16A, memories 16B, and interpolators 16C are provided corresponding to a luminance signal and a color tone signal of the source video signal $V_{in}$. In other words, this is an image converter 16 and, at the same time, converts and processes the luminance signal of the source video signal $V_{in}$ with one set and converts and processes the color tone signal of the source video signal $V_{in}$ with the other set.

(3) Three-Dimensional of the Conversion Address Generator Conversion Address Generation Method In this section, a conversion address generation method in the three-dimensional conversion address generator 11 will be explained. In a case in which the source video signal $V_{in}$ is inserted into the square ABCD shown by the blue plate 6, the source video signal $V_{in}$ will be photographed onto the three-dimensional space. Then, a photographed image must be projected onto the monitor screen surface having a visual position of an operator as the basic point and inserted into the square ABCD. This is because the blue plate 6 exists in the three-dimensional space, and the square ABCD is such that the blue plate 6 which exists in the three-dimensional space is projected onto the monitor screen having the visual position of the operator as the basic point. Consequently, the three-dimensional conversion address generator 11 must calculate the conversion matrix including the photograph onto the three-dimensional space, the projection onto the projection from the three-dimensional space onto the two-dimensional space, and the generator 11 must calculate the reverse line of the conversion matrix to generate the conversion address. This point will be concretely explained hereinbelow.

(3-1) Coordinate definition

Figure 10A:
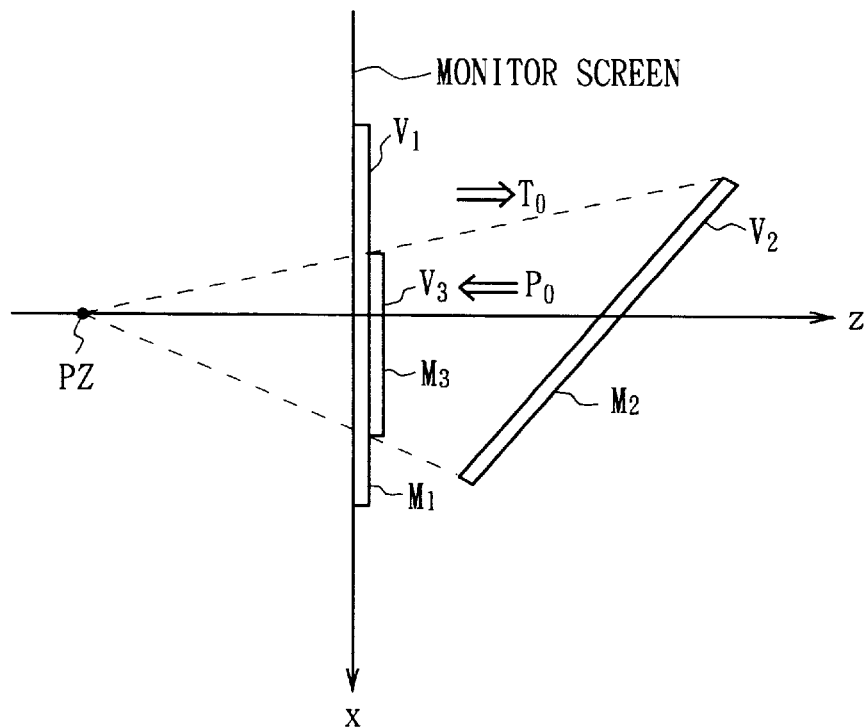
FIGS. 10A and 10B are schematic views which are supplied for the explanation of the principle of three-dimensional image conversion processing.
Figure 10B:
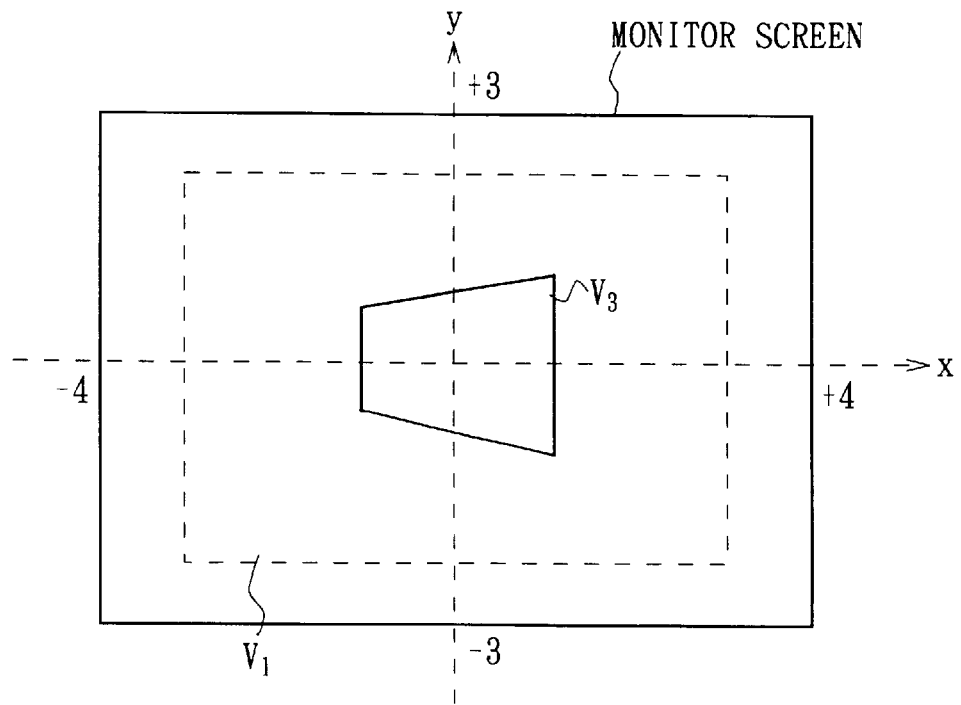

At first, the coordinate of the three-dimensional space will be explained by using FIGS. 10A and 10B. The three-dimensional coordinate which is used in this embodiment is defined as a diagonal XYZ coordinate wherein a horizontal direction of the monitor screen is set as the X axis, a vertical direction of the monitor screen is set as the Y axis, and a plumb direction of the monitor screen is set as the Z axis with the center of the monitor screen being set as the origin point as shown in FIGS. 10A and 10B. In this case, with respect to the X axis, the rightward direction of the monitor screen is set as a plus direction while the leftward direction thereof is set as a minus direction. With respect to the Y axis, an upward direction is set as a plus direction while a downward direction is set as a minus direction. With respect to the Z axis, a depthward direction is set as a plus direction while a forward direction (side on which a viewpoint of the operator exists) is set as a minus direction.

With respect to the X axis in the screen area, an imaginary coordinate value from −4 to +4 is set. With respect to the Y axis direction in the screen area, an imaginary coordinate value from −3 to +3 is set. It thus happens that imaginary coordinate values are set in areas other than the screen area. Furthermore, with respect to the visual position $P_Z$ of the operator, the Z coordinate on the Z axis is imaginarily set at "−16".

(3-2) Basic three dimension image conversion algorithm

Next will be explained a method for generating a video signal wherein the source video signal $V_{in}$ is subjected to three-dimensional image conversion processing (image photograph onto the three-dimensional space and projection of an image from the three-dimensional space onto the monitor screen).

At first, the source video signal $V_{in}$ is not subjected to three-dimensional processing, and is memorized in the memory 16B inside the image converter 16 as it is. Since this source video signal $V_{in}$ is a two-dimension video signal, the video signal is a video signal $V_1$ which exists at the position $M_1$ on the monitor screen as shown in FIG. 10A.

As described above, this source video signal $V_{in}$ must be coordinate converted to the position of the blue plate 6 which exists in the three-dimensional space. Here, the blue plate 6 is in a plus direction of the Z axis as shown in FIG. 10A, and exists at a position $M_2$ which is inclined at about 45 degrees with respect to the screen surface. If the blue plate 6 exists at such a position $M_2$, a parallel movement in the plus direction of the Z axis of the source video signal $V_{in}$ and a rotation processing of about 45 degrees on the Y axis must be performed. Such coordinate conversion processing can be performed by using a three-dimensional conversion matrix $T_0$. In other words, a video signal $V_2$ which exists in the three-dimensional space can be generated by multiplying three-dimensional conversion matrix $T_0$ with each pixel of the source video signal $V_{in}$.

This three-dimensional conversion matrix $T_0$ can be generally represented by the following Equation.

$$T_0 = \begin{pmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{pmatrix} \quad (1)$$

Conversion parameters $r_{11}$ through $r_{33}$ which are used in the three-dimensional matrix conversion $T_0$ are parameters which include elements for rotating the source video signal $V_{in}$ in the X axis direction, in the Y axis direction, and the Z axis direction; elements for expanding/reducing the scale of the source video signal $V_{in}$ in the X axis direction, in the Y axis direction, and in the Z axis direction; and elements for skewing the source video signal $V_{in}$ in the X axis direction, in the Y axis direction, and in the Z axis direction. Furthermore, the conversion parameters $l_x$, $l_y$ and $l_z$ are parameters which include elements for the parallel movement of source video signal $V_{in}$ respectively in the X axis direction, in the Y axis direction, and in the Z axis direction while the conversion parameter s is a parameter which includes elements for the expansion/reduction of the source video signal $V_{in}$ in a uniform manner in the axial direction respectively.

Incidentally, since this conversion matrix $T_0$ represents the coordinate of rotation conversion and the coordinate of the parallel movement and the expansion and reduction conversion within one coordinate, a four-line four-row matrix is provided. Generally, such coordinate is referred to as a homogeneous coordinate.

Since the video signal $V_2$ which is coordinately converted to the three-dimensional space by using the three-dimensional conversion matrix is embedded in the square ABCD in the studio video signal $V_{BK}$, the video signal must be projected and processed on the monitor screen having the viewpoint of the operator as the basic point. In other words, as shown in FIG. 10A, a video signal $V_2$ which is perspected on the XY surface must be determined when the video signal $V_2$ which exists at the position $M_2$ in the three-dimensional space is seen from an imaginary viewpoint $P_Z$ on the Z axis. The projection process can be attained by using the projection conversion matrix $P_0$. That is, the video signal $V_3$ can be determined wherein the video signal $V_2$ which exists in the three-dimensional space is perspected on the XY surface by multiplying the perspective conversion matrix $P_0$ with respect to each pixel of the video signal $V_2$.

This perspective conversion matrix $P_0$ can be generally represented by the following Equation.

$$P_0 = \begin{pmatrix} 1 & 0 & 0 & 0 \\ 0 & 1 & 0 & 0 \\ 0 & 0 & 0 & P_z \\ 0 & 0 & 0 & 1 \end{pmatrix} \quad (2)$$

The parameter $P_Z$ of this perspective conversion matrix $P_0$ is a perspective value for applying the perspective method at the time of seeing, in perspective, the video signal $V_2$ on the XY surface. Normally, this perspective value $P_Z$ is such that $1/16$ is set as a reference value. This means that the Z coordinate value of the imaginary viewpoint $P_Z$ is $-16$. Incidentally, this perspective value $P_Z$ can be changed into a predetermined value in a setting operation done by the operator.

The source video signal $V_{in}$ can be embedded in the square ABCD in the studio video signal $V_{in}$ by subjecting the source video signal $V_{in}$ to coordinate conversion into such a three-dimensional space and projection processing from the three-dimensional space onto the XY surface.

The content of the conversion processing which has been explained above can be summarized in the following manner. In other words, this conversion processing comprises a space image conversion step for obtaining a three-dimensional conversion video signal $V_2$ from the source video signal $V_{in}$ ($V_1$) by the three-dimensional conversion matrix $T_0$, and a perspective conversion step for obtaining a perspective conversion video signal $V_3$ from the three-dimensional conversion video signal $V_2$ by the perspective change matrix $P_0$. Consequently, the conversion matrix T for obtaining the perspective conversion video signal $V_3$ from the source video signal $V_{in}$ ($V_1$) can be represented by the following Equation through the multiplication Equation of the three-dimensional conversion matrix $T_0$ and the perspective conversion matrix $P_0$.

$$T = T0 \cdot P0 = \begin{pmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{pmatrix} \begin{pmatrix} 1 & 0 & 0 & 0 \\ 0 & 1 & 0 & 0 \\ 0 & 0 & 0 & P_z \\ 0 & 0 & 0 & 1 \end{pmatrix} \quad (3)$$

$$= \begin{pmatrix} r_{11} & r_{12} & r_{13} & r_{13}P_z \\ r_{21} & r_{22} & r_{23} & r_{23}P_z \\ r_{31} & r_{32} & r_{33} & r_{33}P_z \\ l_x & l_y & l_z & l_zP_z + s \end{pmatrix}$$

Consequently, when the conversion matrix $T_0$ shown in this Equation (3) is multiplied by each pixel of the source video signal $V_{in}$, the source video signal $V_{out}$ can be generated which can be embedded in the studio video signal $V_{BK}$.

Incidentally, when this video signal processing device 1 generates the source video signal $V_{out}$, the conversion matrix $T_0$ is not multiplied with the source video signal $V_{in}$, and a reading address is determined to which the image conversion is performed by the conversion matrix $T_0$ in actuality. Then, a source video signal $V_{out}$ is generated by reading the source video signal from the memory 16B of the image converter 16 on the basis of the reading address.

In other words, this video signal processing device 1 generates a source video signal $V_{out}$ which can be embedded in the studio video signal $V_{BK}$ by writing the source video signal $V_{in}$ to the memory 16B of the image converter 16 sequentially and by reading the source video signal $V_{in}$ on the basis of the reading address to which image conversion is performed with the conversion matrix $T_0$.

Incidentally, the source video signal $V_{in}$ which is written in the memory 16B and the source video signal $V_{out}$ which is read from the memory 16B are both two-dimensional data, and the memory 16B is also a memory for storing two-dimensional data. As a consequence, in the calculation of the reading address which is used in the reading operation from the memory 16B, a parameter for calculating data in Z axis direction in the three-dimensional space is not actually used. Consequently, a parameter in the third line and third row for calculating the data in the Z axis direction of the conversion matrix T shown in the Equation (3) will not be needed.

When the conversion matrix which has a parameter which is required in the calculation of the reading address is described as $T_{33}$, the conversion matrix $T_{33}$ will exclude the third line and the third row in the Equation (3), and will be represented by the following Equation.

$$T_{33} = \begin{pmatrix} r_{11} & r_{12} & r_{13}P_z \\ r_{21} & r_{22} & r_{23}P_z \\ l_x & l_y & l_zP_z + s \end{pmatrix} \quad (4)$$

Figure 11:
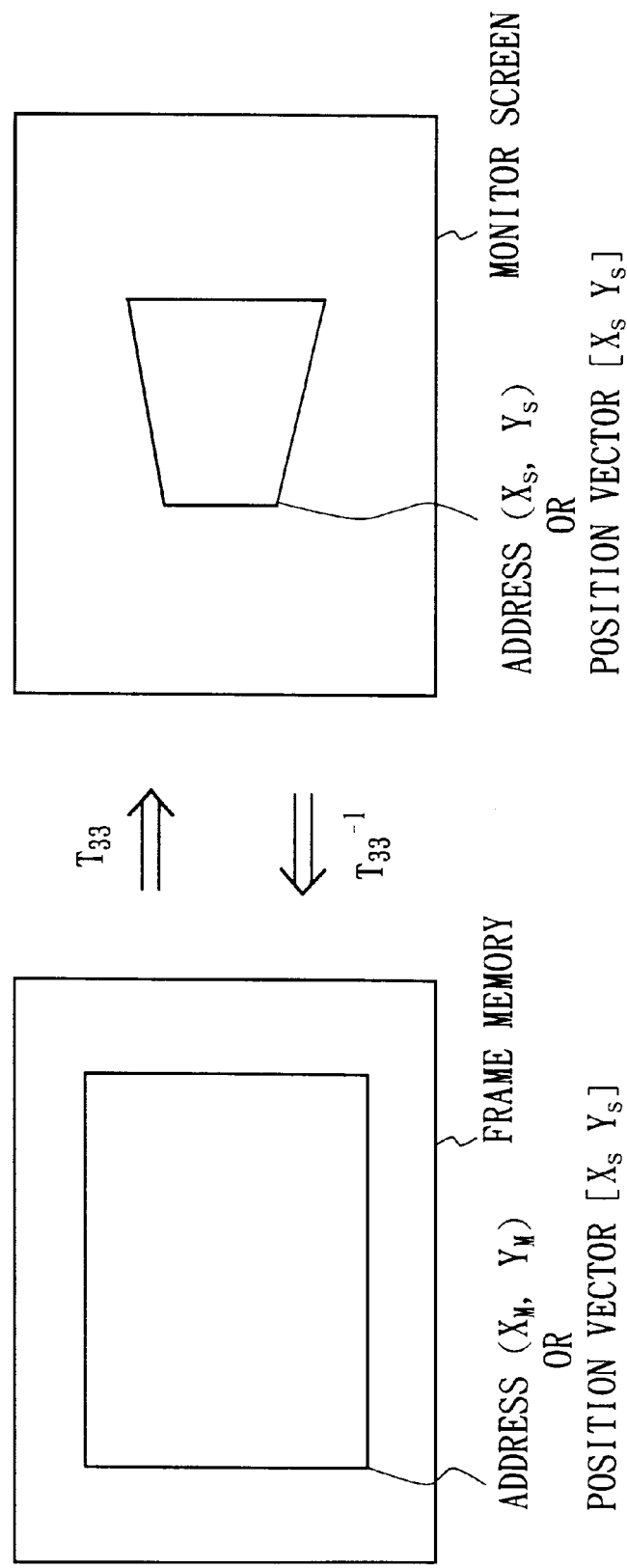
FIG. 11 is a schematic view which is supplied for the explanation of a corresponding relationship between a memory and a position vector of the monitor screen.

Next will be explained a method for calculating a reading address which is used in the reading operation of the source video signal from the memory 16B. At first will be explained the relationship between the position vector in the memory 16B and the position vector on the monitor screen using FIG. 11. However, for simplicity of explanation, an explanation will be made on the supposition that two field memories which are set in a readable state in the memory 16B is one frame memory.

At first, the two-dimensional address in the frame memory is defined as $(X_M, Y_M)$ and the position vector as $(X_M, Y_N)$ (while the address on the monitor screen is defined as $(X_S, Y_S)$ and the position vector as $(X_S, Y_S)$.) Subsequently, when the two-dimensional position vector $[X_M Y_M]$ in the frame memory is represented in the same dimensional coordinate, the vector $[x_m \ y_m \ H_0]$ can be provided. When the position vector $(X_S Y_S)$ on the monitor screen is represented in the same dimensional coordinate, the vector $[x_s \ y_s \ 1]$ can be provided. Incidentally, the parameter "$H_0$" of the same dimensional coordinate is a parameter for representing a size of a vector.

The position vector $[x_m \ y_m \ H_0]$ in the frame memory is converted to the position vector $[x_s \ y_s \ 1]$ on the monitor screen by allowing a conversion matrix $T_{33}$ to act on the position vector $[x_m \ y_m \ H_0]$ in the frame memory. Consequently, a relationship Equation between the position vector $[x_m \ y_m \ H_0]$ in the frame memory and the position vector $[x_s \ y_s \ 1]$ on the monitor screen can be represented in the following Equation.

$$[x_s \ y_s \ 1] = [x_m \ y_m \ H_0] \cdot T_{33} \quad (5)$$

Incidentally, the relationship between the same dimensional coordinate parameter "$H_0$" used in the position vector $[x_m \ y_m \ H_0]$ in the frame memory and the same dimensional coordinate parameter "1" used in the position vector $[x_s \ y_s \ 1]$ on the monitor screen is such that the position vector $[x_s \ y_s \ H_0]$ in the frame memory is converted to the position vector $[x_s \ y_s]$ on the screen by means of the conversion matrix $T_{33}$, and the size "$H_0$" of the position vector $[x_m \ y_m]$ in the frame memory is converted to a size "1" of the position vector $[x_s \ y_s]$ on the monitor screen.

Incidentally, in a device in which space conversion processing is performed with respect to the source video signal $V_{in}$ by supplying a reading address corresponding to the conversion matrix $T_{33}$ to the frame memory as can be seen in the case of this video signal processing device 1, a point on the monitor screen corresponding to the point in the frame memory is not determined, and a point in the frame memory corresponding to the point on the monitor screen must be determined. In other words, as is shown in the following Equation (5), $$[x_m \ y_m \ H_0] = [x_s \ y_s \ 1] \cdot T_{33}^{-1} \quad (6)$$

It is necessary to calculate the position vector $[x_m \ y_m \ H_0]$ in the frame memory by using a reverse matrix $T_{33}^{-1}$ of the conversion matrix $T_{33}$ by referencing the position vector $[x_s \ y_s \ 1]$ on the monitor screen.

Next will be explained a method for actually determining a two-dimensional position vector $[X_M \ Y_M]$ in the frame memory on the basis of this concept. At first, the conversion matrix $T_{33}$ is represented in parameters $a_{11}$ through $a_{33}$ as is shown in the following Equation.

$$T_{33} = \begin{pmatrix} r_{11} & r_{12} & r_{13}P_z \\ r_{21} & r_{22} & r_{23}P_z \\ l_x & l_y & l_zP_z + s \end{pmatrix} = \begin{pmatrix} a_{11} & a_{12} & a_{13} \\ a_{21} & a_{22} & a_{23} \\ a_{31} & a_{32} & a_{33} \end{pmatrix} \quad (7)$$

The reverse matrix $T_{33}^{-1}$ is represented in parameters $b_{11}$ through $b_{33}$ as is shown in the following Equation.

$$T_{33}^{-1} = \begin{pmatrix} a_{11} & a_{12} & a_{13} \\ a_{21} & a_{22} & a_{23} \\ a_{31} & a_{32} & a_{33} \end{pmatrix}^{-1} = \begin{pmatrix} b_{11} & b_{12} & b_{13} \\ b_{21} & b_{22} & b_{23} \\ b_{31} & b_{32} & b_{33} \end{pmatrix} \quad (8)$$

where, $b_{ij} = \dfrac{a_{ji}}{det(T_{33})}$

When the reverse matrix $T_{33}^{-1}$ is substituted into the Equation (6) and is expanded, the following Equation can be provided.

$$\begin{aligned}[] [x_m \ y_m \ H_0] &= [x_s \ y_s \ 1] \begin{pmatrix} b_{11} & b_{12} & b_{13} \\ b_{21} & b_{22} & b_{23} \\ b_{31} & b_{32} & b_{33} \end{pmatrix} \\ &= [\,b_{11}x_s + b_{21}y_s + b_{31} \\ &\quad\ \ b_{12}x_s + b_{22}y_s + b_{23} \\ &\quad\ \ b_{13}x_s + b_{23}y_s + b_{33}\,] \end{aligned} \quad (9)$$

The position vector $[x_m \ y_m \ H_0]$ in the frame memory can be represented from this Equation (9) as shown in the following Equation.

$$x_m = b_{11}x_s + b_{21}y_s + b_{31}, y_m = b_{12}x_s + b_{22}y_s + b_{32}, H_0 = b_{13}x_s + b_{23}y_s + b_{33} \quad (10)$$

In a case in which the position vector $[x_m \ y_m \ H_0]$ of the same dimensional coordinate in the frame memory which is determined in this manner is converted to a two-dimensional position vector $[X_M \ Y_M]$ in the frame memory, the following procedure can be favorably performed. In other words, the parameter "$H_0$" which is used for converting the two-dimensional position vector $[X_M \ Y_M]$ to the same dimensional coordinate is a parameter showing a size of the position vector $[x_m \ y_m]$ of the same dimensional coordinate. Thus, in order to convert the position vector of the same dimensional coordinate to the two-dimensional position vector, the parameters "$x_m$" and "$y_m$" which represent the direction of a position vector of the same dimensional coordinate may well be normalized with the parameter "$H_0$" showing a size of the position vector of the same dimensional coordinate. Consequently, each of the parameters "$X_M$" and "$Y_M$" of the two-dimensional position vector in the frame memory can be determined from the following Equation.

$$X_M = x_m/H_0, Y_M = y_m/H_0 \quad (11)$$

Furthermore, the case of converting the position vector $[x_s \ y_s \ 1]$ of the same dimensional coordinate on the monitor screen to the two-dimensional position vector $[X_S \ Y_S]$ can be performed using the same concept, and the parameters "$x_s$" and "$y_s$" showing a direction of the position vector of the same dimensional coordinate may well be normalized with a parameter "1" showing a size of the position vector of the same dimensional coordinate. Consequently, each of the parameters "$x_s$" and "$y_s$" of the two-dimensional position vector on the monitor screen may be determined from the following Equation.

$$X_S = x_s, Y_S = y_s \quad (12)$$

When the Equation (10) and the Equation (12) are substituted in the Equation (11), each of the parameters "$X_M$" and "$Y_M$" of the two-dimensional position vector in the frame memory can be represented as can be seen in the following Equations.

$$X_M = \frac{x_m}{H_0} \quad (13)$$
$$= \frac{b_{11}x_s + b_{21}y_s + b_{31}}{b_{13}x_s + b_{23}y_s + b_{33}}$$
$$= \frac{b_{11}X_S + b_{21}Y_S + b_{31}}{b_{13}X_S + b_{23}Y_S + b_{33}}$$

$$Y_M = \frac{y_m}{H_0} \quad (14)$$
$$= \frac{b_{12}x_s + b_{22}y_s + b_{33}}{b_{13}x_s + b_{23}y_s + b_{33}}$$
$$= \frac{b_{12}X_S + b_{22}Y_S + b_{32}}{b_{13}X_S + b_{23}Y_S + b_{33}}$$

The position vector $[X_M\ Y_M]$ in the frame memory can be determined from these Equations (13) and (14) and, at the same time, the reading address $[X_M, Y_M]$ in the frame memory can be determined.

Next, each parameter of the reverse matrix $T_{33}^{-1}$ which is used in the Equations (13) and (14) can be determined. Each of the parameters $b_{11}$ through $b_{33}$ of the reverse matrix $T_{33}^{-1}$ can be represented by using each of the parameters $a_{11}$ through $a_{33}$ of the conversion matrix $T_{33}$ in the following Equations.

$$b_{11} = -\frac{-a_{32}a_{23} + a_{22}a_{32}}{W_1} \quad (15)$$

$$b_{12} = \frac{a_{32}a_{13} - a_{12}a_{33}}{W_1} \quad (16)$$

$$b_{13} = \frac{-a_{22}a_{13} + a_{12}a_{23}}{W_1} \quad (17)$$

$$b_{31} = \frac{a_{31}a_{23} - a_{21}a_{33}}{W_1} \quad (18)$$

$$b_{22} = -\frac{-a_{31}a_{13} + a_{11}a_{33}}{W_1} \quad (19)$$

$$b_{23} = \frac{a_{21}a_{13} - a_{11}a_{23}}{W_1} \quad (20)$$

$$b_{31} = \frac{-a_{22}a_{31} + a_{21}a_{32}}{W_1} \quad (21)$$

$$b_{32} = \frac{a_{12}a_{31} - a_{11}a_{22}}{W_1} \quad (22)$$

$$b_{33} = \frac{-a_{12}a_{21} + a_{11}a_{22}}{W_1} \quad (23)$$

However, the parameter $W_1$ is a value which is represented in the following Equation.

$$W_1 = -a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \quad (24)$$

Here, the value of each of the parameters $a_{11}$ through $a_{33}$ is represented from the relationship equation of the Equation (7) in the following Equations.

$$a_{11} = r_{11},\ a_{12} = r_{12},\ a_{13} = r_{12}P_Z \quad (25)$$
$$a_{21} = r_{21},\ a_{22} = r_{22},\ a_{23} = r_{22}P_Z \quad (26)$$
$$a_{31} = l_x,\ a_{32} = l_y,\ a_{33} = l_z P_Z + s \quad (27)$$

Thus, when the Equations (25) through (27) are substituted in the Equations (15) through (24), the Equations (15) through (24) can be transformed into the following Equations.

$$b_{11} = \frac{-l_y r_{23}P_Z + r_{22}(l_z P_Z + s)}{W_1} \quad (28)$$

$$b_{12} = \frac{l_y r_{13}P_Z + r_{12}(l_z P_Z + s)}{W_1} \quad (29)$$

$$b_{13} = \frac{-r_{22}r_{13}P_Z + r_{12}r_{23}P_Z}{W_1} \quad (30)$$

$$b_{31} = \frac{l_x r_{23}P_Z - r_{21}(l_z P_Z + s)}{W_1} \quad (31)$$

$$b_{32} = \frac{-l_x r_{13}P_Z + r_{11}(l_z P_Z + s)}{W_1} \quad (32)$$

$$b_{23} = \frac{r_{21}r_{13}P_Z - r_{11}r_{23}P_Z}{W_1} \quad (33)$$

$$b_{31} = \frac{-r_{22}l_x + r_{21}l_y}{W_1} \quad (34)$$

$$b_{32} = \frac{r_{12}l_x - r_{11}l_y}{W_1} \quad (35)$$

$$b_{33} = \frac{-r_{12}r_{21} + r_{11}r_{32}}{W_1} \quad (36)$$

$$W_1 = -r_{22}l_x r_{13}P_Z + r_{21}l_y r_{13}P_Z + r_{12}l_x r_{22}P_Z - \quad (37)$$
$$r_{11}l_y r_{23}P_Z - r_{12}r_{21}(l_z P_Z + s) +$$
$$r_{11}r_{22}(l_z P_Z + s)$$

Thus, when the Equations (28) through (37) are substituted in the Equations (13) and (14), the reading address $[X_M, Y_M]$ in the frame memory can be determined from the following Equation.

$$X_M = \frac{1}{H_0}[\{-l_x r_{23}P_Z + r_{22}(l_z P_Z + s)\}X_S + \quad (38)$$
$$\{l_y r_{13}P_Z + r_{12}(l_z P_Z + s)\}Y_S +$$
$$(-r_{22}r_{13}P_Z + r_{12}r_{23}P_Z)]$$

$$Y_M = \frac{1}{H_0}[\{l_x r_{23}P_Z - r_{21}(l_z P_Z + s)\}X_S + \quad (39)$$
$$\{-l_y + r_{11}(l_z P_Z + s)\}Y_S +$$
$$(r_{21}r_{13}P_Z - r_{11}r_{23}P_Z)]$$

Incidentally, the parameter $H_0$ can be represented in the following Equation by substituting the Equations (34) through (36) in the Equation (10).

$$H_0 = (-r_{22}l_x + r_{21}l_y)X_S + (r_{12}l_x - r_{11}l_y)Y_S + (-r_{12}r_{21} + r_{11}r_{22}) \quad (40)$$

In this manner, the reading address $(X_M, Y_M)$ in the frame memory can be represented by using each of the parameters ($r_{11}$ through $r_{33}$, $l_x$, $l_y$, $l_z$, s and $P_Z$) of the conversion matrix $T_{33}$. Consequently, the screen address ($X_S, Y_S$) is supplied to each of the pixels to correspond to the raster scan sequence of the monitor screen from the Equations (38) through (40), the reading address ($X_M, Y_M$) in the frame memory corresponding to the screen address which is supplied can be determined sequentially.

(3-3) Conversion matrix $T_{33}$ calculation

As described above, each of the parameters of the conversion matrix $T_{33}$ is understood, the reading address ($X_M$, $Y_M$) of the frame memory can be determined by using the Equations (38) through (40). Here, a method for calculating each of the parameters of this conversion matrix $T_{33}$ will be explained.

The relationship between the position vector in the frame memory and the position vector on the monitor screen will be the relationship as shown in the Equation (5) described above. Consequently, an actual value of the position vector is substituted in this Equation (5), and each parameter of the conversion matrix $T_{33}$ can be determined.

As a position vector on the monitor screen, the four corners vector position A, B, C, and D of the square ABCD which is detected with the corner detector 9 is used. Furthermore, as the position vector in the frame memory, the position vector of four corners I, J, K, and L of the selected image area IJKL designated by the operator is used. Incidentally, since the address signal S2 in the display coordinate of four corners of the selected image area IJKL is sent from the controller 18 as described above, the position vector in the memory of four corners of the selected image area IJKL is calculated on the basis of the address signal S2 in the three-dimensional conversion address generator 11 and the position vector is used as the position vector of the corners I, J, K and L.

At first, the position vectors of four corners A, B, C, and D of the square ABCD are defined as $[X_1\ Y_1]$, $[X_2\ Y_2]$, $[X_3\ Y_3]$, and $[X_4\ Y_4]$ while the position vectors of four corners I, J, K, and L of the selected image areas IJKL designated by the operator are defined as $[X'_1\ Y'_1]$, $[X'_2\ Y'_2]$, $[X'_3\ Y'_3]$, and $[X'_4\ Y'_4]$. When the position vectors are represented in the same dimensional coordinate respectively, the position vectors of four corners A, B, C, and D are represented in the following Equations.

$$[X_i K_i\ Y_i K_i\ K_i]\ i\text{ is from 1 to 4} \tag{41}$$

The position vectors of the four corners I, J, K, and L are represented in the following Equation.

$$[X'_i\ Y'_i\ 1]\ i\text{ is from 1 to 4} \tag{42}$$

When the position vector of the same dimensional coordinate is substituted in the Equation (5), the following Equation can be obtained.

$$[X_i K_i\ Y_i K_i\ K_i] = [X'_i\ Y'_i\ 1] \cdot T_{33} \tag{43}$$

The conversion matrix $T_{33}$ is defined as shown in the following Equation.

$$T_{33} = \begin{pmatrix} a_{11} & a_{12} & a_{13} \\ a_{21} & a_{22} & a_{23} \\ a_{31} & a_{32} & a_{33} \end{pmatrix} \tag{44}$$

The Equation (43) can be transformed as shown in the following Equation.

$$[X_i \cdot K_i\ Y_i \cdot K_i\ K_i] = [X'_i\ Y'_i\ 1] \cdot \begin{pmatrix} a_{11} & a_{12} & a_{13} \\ a_{21} & a_{22} & a_{23} \\ a_{31} & a_{32} & a_{33} \end{pmatrix} \tag{45}$$

When this Equation (45) is expanded, the following Equation can be represented.

$$[X_i \cdot K_i\ Y_i \cdot K_i\ K_i] = [a_{11} X'_i + a_{21} Y'_i + a_{31} \tag{46}$$
$$a_{12} X'_i + a_{22} Y'_i + a_{32}$$
$$a_{13} X'_i + a_{23} Y'_i + a_{33}]$$

From the Equation (46), the following Equations can be obtained with respect to each of the parameters "$X_i$", "$Y_i$", and "$K_i$".

$$X_i \cdot K_i = a_{11} X'_i + a_{21} Y'_i + a_{31} \tag{47}$$

$$Y_i \cdot K_i = a_{12} X'_i + a_{22} Y'_i + a_{32} \tag{48}$$

$$K_i = a_{13} X'_i + a_{23} Y'_i + a_{33} \tag{49}$$

When the Equation (49) is substituted into the Equations (47) and (48), the Equations with respect to the parameters "$X_i$" and "$Y_i$" can be obtained as shown in the following Equations.

$$Y_i = \frac{a_{11} X'_i + a_{21} Y'_i + a_{31}}{a_{13} X'_i + a_{23} Y'_i + a_{33}} \tag{50}$$

$$Y_i = \frac{a_{12} X'_i + a_{22} Y'_i + a_{32}}{a_{12} X'_i + a_{23} Y'_i + a_{33}} \tag{51}$$

When the denominator and numerator on the right side of the Equations (50) and (51) are divided by the parameter "$a_{33}$", the following Equations are represented.

$$X_i = \frac{a_{11}/a_{33} X'_i + a_{21}/a_{33} Y'_i + a_{31}/a_{33}}{a_{13}/a_{33} X'_i + a_{23}/a_{33} Y'_i + 1} \tag{52}$$

$$Y_i = \frac{a_{12}/a_{33} \cdot X'_i + a_{22}/a_{33} \cdot Y'_i + a_{32}/a_{33}}{a_{13}/a_{33} \cdot X'_i + a_{23}/a_{33} \cdot Y'_i + 1} \tag{53}$$

It can be seen that when then Equation is divided by the parameter "$a_{33}$", the values of the parameters "$X_i$" and "$Y_i$" remain unchanged. Even when the conversion matrix $T_{33}$ is substituted with the conversion matrix $T_{33}'$ of the following Equation, the Equation (45) is established. In other words, the following Equation is established.

$$T'_{33} = \begin{pmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{pmatrix} \tag{54}$$

$$= \begin{pmatrix} a'_{11} & a'_{12} & a'_{13} \\ a'_{21} & a'_{22} & a'_{23} \\ a'_{31} & a'_{32} & 1 \end{pmatrix}$$

$$[X_i \cdot K_i\ Y_i \cdot K_i\ K_i] = [X'_i\ Y'_i\ 1] \cdot T'_{33} \tag{55}$$

$$= [X'_i\ Y'_i\ 1] \cdot \begin{pmatrix} a'_{11} & a'_{12} & a'_{13} \\ a'_{21} & a'_{22} & a'_{23} \\ a'_{31} & a'_{32} & 1 \end{pmatrix}$$

When the Equation (55) is expanded with respect to i=1 through 4, 12 simultaneous first Equations are obtained with respect to the parameters $a_{11}'$ through $a_{33}'$ and $K_1$ through $K_4$ as shown in the following Equations.

$$X_1 \cdot K_1 = a_{11}' X'_1 + a_{21}' Y'_1 + a_{31}' \tag{56}$$

$$Y_1 \cdot K_1 = a_{13}' X'_1 + a_{23}' Y'_1 + a_{32}' \tag{57}$$

$$K_1 = a_{13}' X'_1 + a_{23}' Y'_1 + 1 \tag{58}$$

$$X_2 \cdot K_2 = a_{11} X'_2 + a_{21} Y'_2 + a_{31}' \quad (59)$$

$$Y_2 \cdot K_2 = a_{12} X'_2 + a_{22} Y'_2 + a_{32}' \quad (60)$$

$$K_2 = a_{13} X'_2 + a_{23} Y'_2 + 1 \quad (61)$$

$$X_3 \cdot K_3 = a_{11} X'_3 + a_{21} Y'_3 + a_{31}' \quad (62)$$

$$Y_3 \cdot K_3 = a_{12} X'_3 + a_{22} Y'_3 + a_{32}' \quad (63)$$

$$K_3 = a_{12} X'_3 + a_{33} Y'_3 + 1 \quad (64)$$

$$X_4 \cdot K_4 = a_{11} X'_4 + a_{21} Y'_{4+a31}' \quad (65)$$

$$Y_4 \cdot K_4 = a_{12} X'_4 + a_{22} Y'_4 + a_{32}' \quad (66)$$

$$K_4 = a_{13} X'_4 + a_{23} Y'_4 + 1 \quad (67)$$

This simultaneous first Equation can be solved because the parameters are 12. Consequently, the parameters $a_{11}'$ through $a_{33}'$ and thus, the conversion matrix $T_{33}'$ can be determined. Incidentally, with respect to the conversion matrix $T_{33}$, the conversion matrix $T_{33}'$ can be determined by multiplying the predetermined expansion/reduction parameter $a_{33}$ to the determined conversion matrix $T_{33}'$.

(3-4) Conversion address generation

As the three-dimensional conversion address generator 11, a conversion address supplied to the image converter 16 will be generated in the sequence which has been explained above. In other words, the three-dimensional conversion address generator 11 sets a simultaneous first Equation with respect to each parameter of the aforementioned conversion matrix $T_{33}$ on the basis of the position vector of four corners of the square ABCD supplied from the corner detector 9 as an address signal S1 and the position vector of four corners of the selected image area IJKL supplied from the controller 18 as an address signal S2 with the result that the conversion matrix $T_{33}$ is determined by solving the simultaneous first Equation. Next, the three-dimensional conversion address generator 11 uses each of the parameters of the conversion matrix $T_{33}$ which has been determined to determine the reverse matrix $T_{33}^{-1}$. Then, on the basis of each of the parameters of the reverse matrix $T_{33}^{-1}$ and a screen address $(X_S, Y_S)$ supplied from the screen address generator 22 as a screen address signal S3 the conversion address $(X_M, Y_M)$ to be supplied to image converter 16 is determined, and the conversion address is supplied to the image converter 20 as a conversion address signal S4. Incidentally, more specifically, the sequence of determining a reverse matrix $T_{33}^-$ from the conversion matrix $T_{33}$ is actually omitted, and a calculation of the aforementioned Equations (38) through (40) is performed by using each of the parameters of the conversion matrix $T_{33}$ with the result that the conversion address $(X_M, Y_M)$ is directly determined.

(4) Corner Detector Structure

Figure 12:
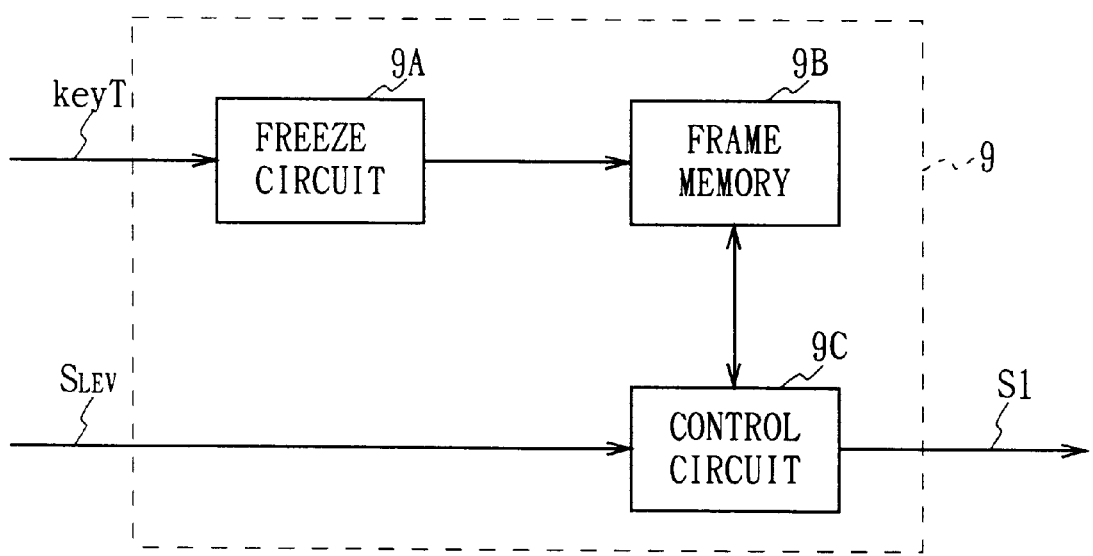
FIG. 12 is a block diagram showing a structure of a corner detector.

In this section, a concrete structure of the aforementioned corner detector 9 will be explained. As shown in FIG. 12, in the corner detector 9, a target key signal keyT which is supplied from the chromakey device 7 is received with a freeze circuit 9A. The freeze circuit 9A extracts data of a desired one frame from the target key signal keyT and supplies the data to the frame memory 9B. A writing operation of the frame memory 9B is controlled with a control circuit 9C, and data of one frame portion of the target key signal keyT is stored in the inside memory area sequentially and the data is memorized.

The control circuit 9C constitutes a corner detection means for detecting each corner position of the square area from the target key signal keyT. In this control circuit 9C is input the reference signal level $S_{LEV}$ which is supplied from the input device 10. On the basis of this reference signal level $S_{LEV}$ and the data of the target key signal keyT which is stored in the frame memory 9B, this control circuit 9C detects the four corner positions of the area where the signal level of the target key signal keyT becomes more than the reference signal level $S_{LEV}$ to generate an address signal S1 showing four corner positions. At this time, the control circuit 9C reads sequentially from a determined direction data which is stored in the frame memory 9B to search for a point where the signal level becomes more than the reference signal level $S_{LEV}$ to detect the corner position.

Figure 13:
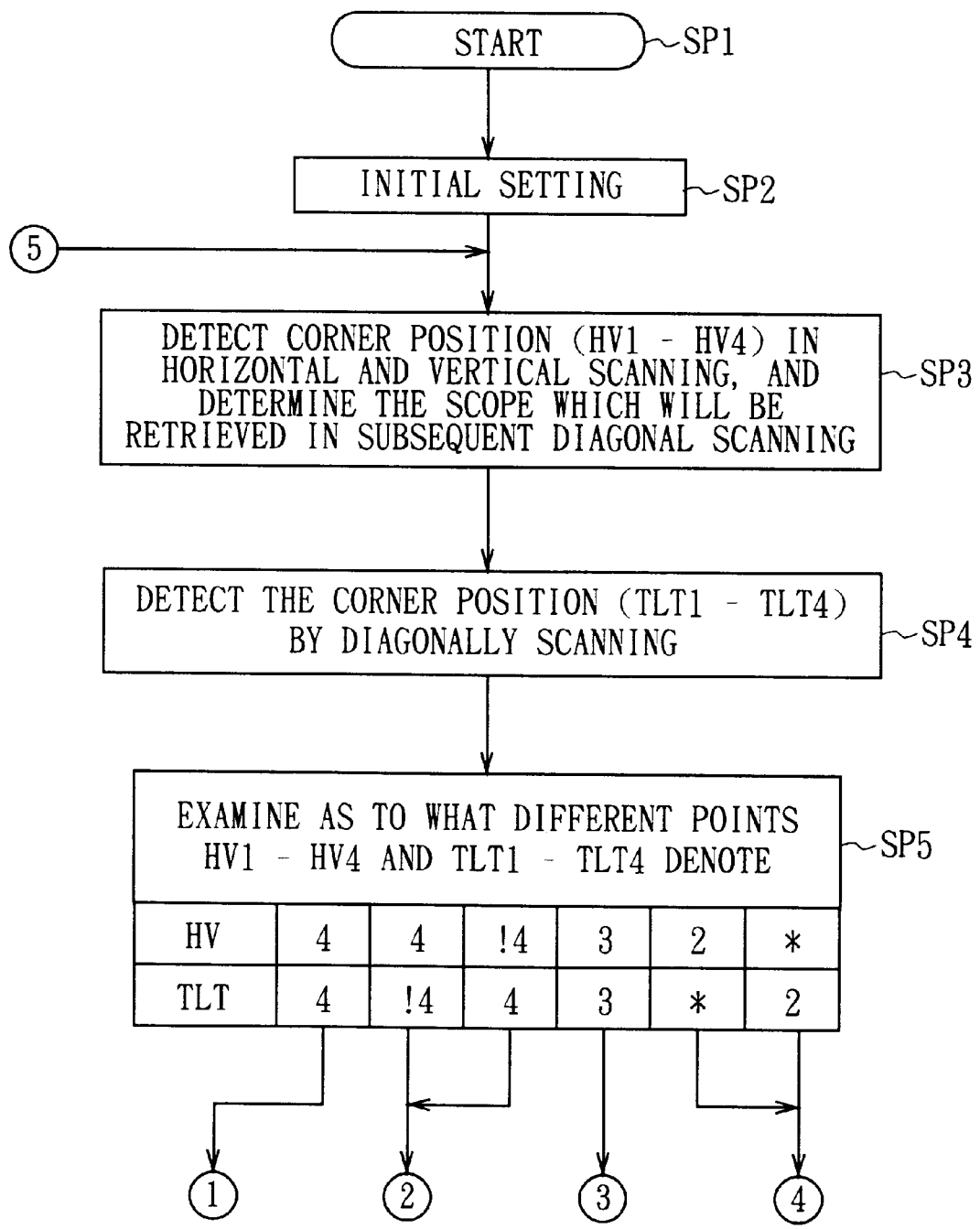
FIG. 13 is a flowchart showing a corner detection method of the corner detector.
Figure 14:
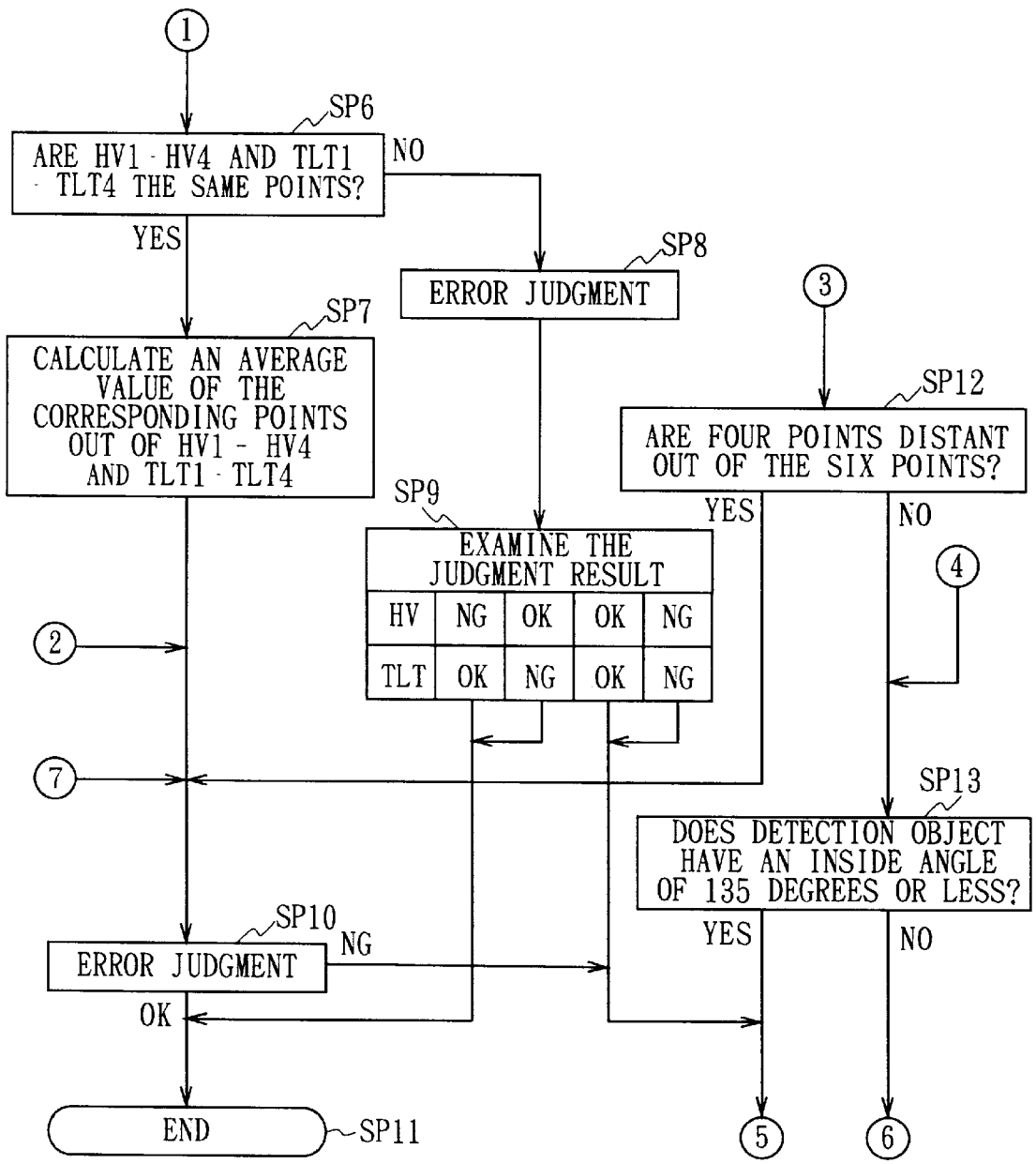
FIG. 14 is a flowchart showing a corner detection method of the corner detector.
Figure 15:
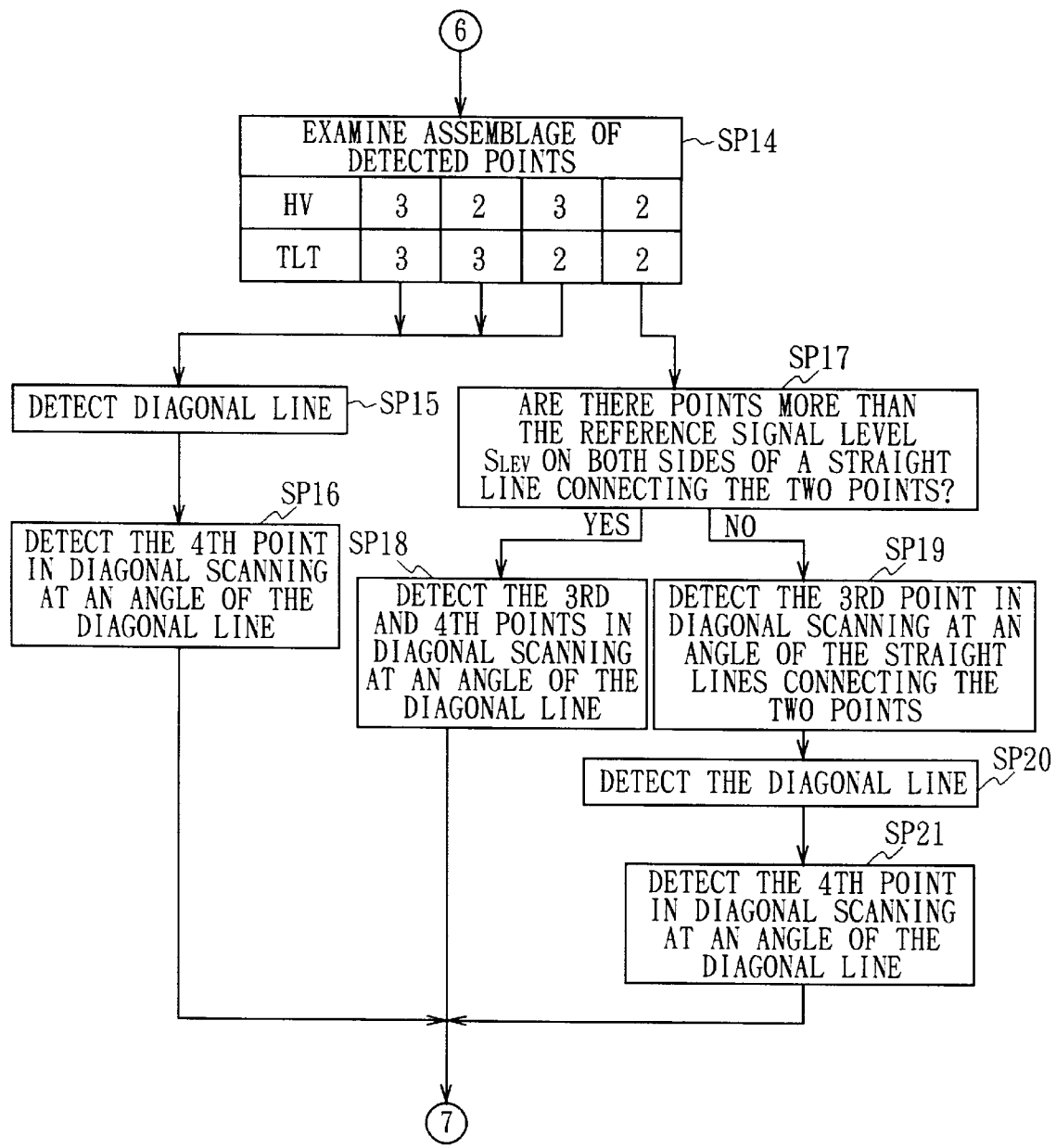
FIG. 15 is a flowchart showing a corner detection method of the corner detector.

Here, a method for detecting a corner in the control circuit 9C will be concretely explained by using a flowchart shown in FIGS. 13 through 15.

At first, at step SP2 starting from step SP1, the control circuit 9C receives from the input device 10 the reference signal level $S_{LEV}$ which is input by the operator using the input device 10. Furthermore, the control circuit 9C receives as initial setting the initial retrieval scope at the time of retrieving the corner position from the target key signal keyT, a judgment reference value at the time of judging whether or not the point is the same point which will be described later, and a detection condition of whether or not the corner of the area having an inside angle of 135 degrees or more which will be described later. This initial retrieval scope and the judgment reference value and detection conditions and the like are input by the operator by using the input device 10 in the same manner as the reference signal level $S_{LEV}$.

Incidentally, the reason why the initial retrieval scope is set is that there is considered a case in which there are two or more areas where the signal level becomes more than the reference signal level $S_{LEV}$ in the target key signal keyT. For reference, in the following explanation, it will be explained that there is only one detection object area in the target key signal keyT, and the whole of the target key signal keyT is designated as the initial retrieval scope.

Figure 16:
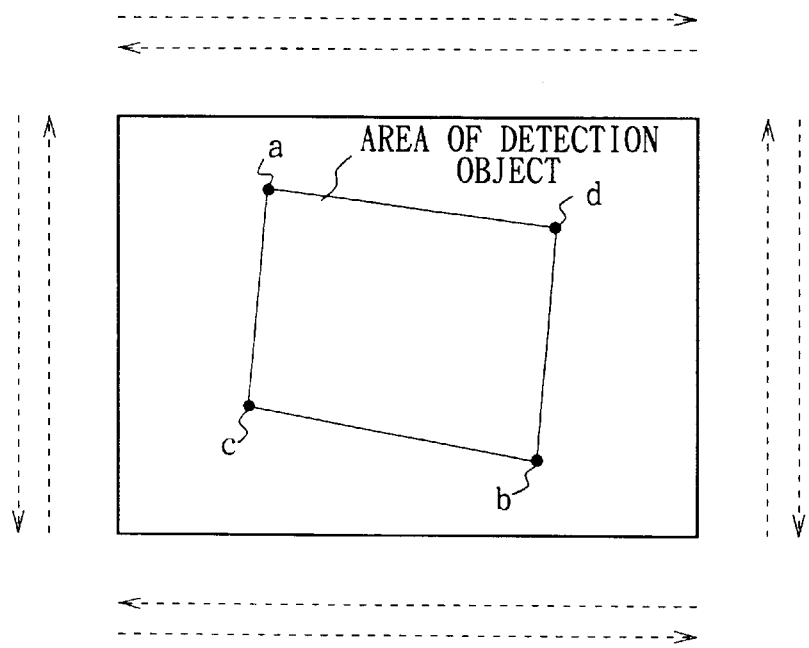
FIG. 16 is a schematic view showing a horizontal and a vertical scan direction.

At the following step SP3, the control circuit 9C reads data of the frame memory 9B in a horizontal direction sequentially from the upper limit to the lower limit of the initial retrieval scope and, at the same time, the control circuit 9C reads data of the frame memory 9B in a vertical direction from the left end to the right end of the initial retrieval scope so that the corner position is detected. Specifically, as shown in FIG. 16, at first, the control circuit 9C reads in a horizontal direction data stored in the frame memory 9B sequentially from a first line which is the upper limit of the initial retrieval scope to search for a point (point a in FIG. 16) where the signal level first becomes more than the reference signal level $S_{LEV}$ to detect the address of the point as the first corner position HV1 (hereinafter this processing is referred to as a horizontal scan from the top). Next, the control circuit 9C reads data of the frame memory 9B in a horizontal direction sequentially from the last line which is the lower limit of the initial retrieval scope to search for a point where the signal level first becomes more than the reference signal level $S_{LEV}$ (point by in FIG. 16) so that the address of the point is detected as the second corner position HV2 (hereinafter this processing is referred to as the horizontal scan from the bottom). Next, the control circuit 9C reads in a vertical direction data of the frame memory 9B sequentially from the top of the line which is the left end of the initial retrieval scope to search for a point (point c in FIG. 16) where the signal level first becomes more than the reference signal level $S_{LEV}$ to detect the address of the point as the third corner position HV3 (hereinafter this processing is referred to as the vertical scan from the left). Next, the control circuit 9C reads data of the frame memory 9B in the vertical direction sequentially from the end of the line which is the right end of the initial retrieval scope to search for a point (point d in FIG. 16) where the signal level first becomes more than the reference signal level $S_{LEV}$ to detect the address of the point as the fourth corner position HV4 (hereinafter this processing is referred to as a vertical scan from the right).

For reference, the four corner positions HV1 through HV4 detected in the horizontal and vertical scan are not necessarily different points, and may show the same point depending on the configuration of the area.

Next, at step SP 3, the control circuit 9C detects on the basis of these detected corner positions HV1 through HV4 the upper limit, the lower limit, the left end, and the right end of the area where the signal level first becomes more than the reference signal level $S_{LEV}$ so that the scope of retrieval of the diagonal scan which will be performed at the next step is determined. Incidentally, in the following explanation, it will be explained that the same scope as the initial retrieval scope is designated for the retrieval scope of the diagonal scan. For reference, by newly setting the retrieval scope of the diagonal scan, the time required for diagonal scanning can be shortened.

Figure 17:
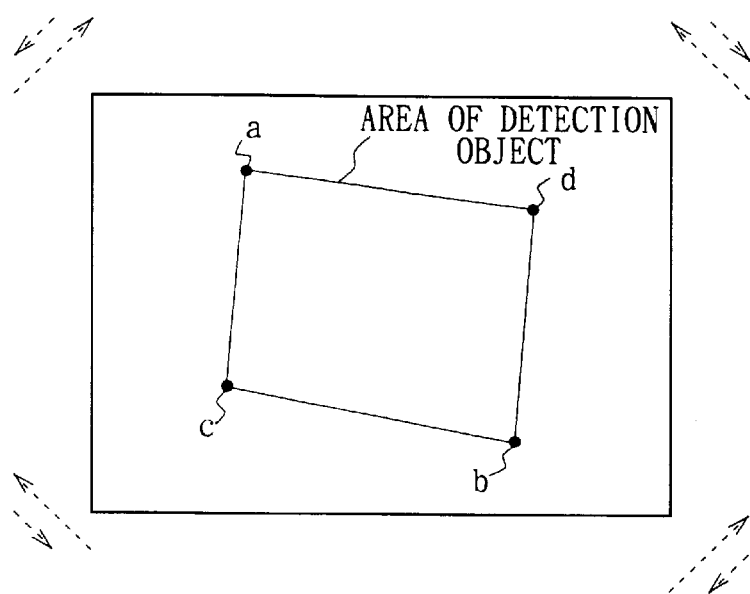
FIG. 17 is a schematic view showing a diagonal scan direction.

At the following step SP4, the control circuit 9C detects the corner position by reading data of the frame memory 9B in a diagonal direction sequentially from each angle of the retrieval scope. Specifically, as shown in FIG. 17, the control circuit 9C searches for a point where the signal level first becomes more than the reference signal level $S_{LEV}$ (point a in FIG. 17) by reading data of the frame memory 9B in a diagonal direction sequentially from a left high angle of the retrieval scope to detect the address of the point as the first corner position TLT1 by diagonal scanning. Next, the control circuit 9C searches for a point where the signal level first becomes more than the reference signal level $S_{LEV}$ (point c in FIG. 17) by reading data of the frame memory 9B in a diagonal direction sequentially from a left low angle of the retrieval scope to detect the address of the point as the second corner position TLT2 by diagonal scanning. Next, the control circuit 9C searches for a point where the signal level first becomes more than the reference signal level $S_{LEV}$ (point d in FIG. 17) by reading data of the frame memory 9B in a diagonal direction sequentially from a right high angle of the retrieval scope to detect the address of the point as the third corner position TLT3 by diagonal scanning. Next, the control circuit 9C searches for a point where the signal level first becomes more than the reference signal level $S_{LEV}$ (point b in FIG. 17) by reading data of the frame memory 9B in a diagonal direction sequentially from a right low angle of the retrieval scope to detect the address of the point as the fourth corner position TLT4 by diagonal scanning.

For reference, in diagonal scanning, the reading address is shifted in a horizontal direction and a vertical direction by one address with the result that the reading angle is set to an inclination of 45 degrees or −45 degrees with respect to the horizontal line.

Next, the four corner positions TLT1 through TLT4 which are detected in the diagonal scanning do not necessarily become different points and may become the same point depending on the configuration of the area.

At the next step SP5, the control circuit 9C inspects whether or not the corner positions HV1 through HV4 detected in the horizontal and the vertical scanning show the same point respectively and also inspects whether or not the corner positions TLT1 through TLT4 which are detected in the diagonal scanning show the same point respectively.

Specifically, distances between the points shown by the corner positions HV1 through HV4 are examined on the basis of the address of the corner positions HV1 through HV4. When the distances are less than the judgment reference value, it is judged that the points are the same points. When the distances exceed the judgment reference value, it is judged that the points are different points. In a similar manner, distances between the points shown by the corner positions TLT1 through TLT4 are examined on the basis of the address of the corner positions TLT1 through TLT4. When the distances are less than the judgment reference value, it is judged that the points are the same points. When the distances exceed the judgment reference value, it is judged that the points differ.

In this manner, the control circuit 9C inspects whether or not the corner positions HV1 through HV4 and the corner positions TLT1 through TLT4 are the same points, and inspects whether or not the corner positions HV1 through HV4 and the corner positions TLT1 through TLT4 show different points. Then, the control circuit 9C moves to the predetermined processing, explained hereinbelow in accordance with the judgment result. At first, as a result of judgment at step SP5, in a case in which the corner positions HV1 through HV4 and the corner positions TLT1 through TLT4 shows four different points, the process moves to step SP6.

At step SP6, the control circuit 9C inspects whether or not the corner positions HV1 through HV4 show the same four points and the corner positions TLT1 through TLT4 show the same four points. Specifically, distances between corresponding points out of the four points shown by the corner positions HV1 through HV4 and the four points shown by the corner points TLT1 through TLT4 are examined. When the distance is less than the judgment reference value, it is judged that the four points are identical. When the distance exceeds the judgment reference value, it is judged that points are identical. As a result, in a case in which the corner positions HV1 through HV4 and the corner positions TLT1 through TLT4 mutually show the same point, the process moves to step SP7. When the corner positions corner positions TLT1 through TLT4 are different points, the process moves to step SP8.

At step SP7, the control circuit 9C determines an average value of corresponding points out of the corner positions HV1 through HV4 and the corner positions TLT1 through TLT4 thereby obtaining an address of four points which seem to be corners. The average value mentioned here refers to an average value of the address because the corner positions HV1 through HV4 and the corner positions TLT1 through TLT4 show an address respectively. When this process is completed, the control circuit 9C moves to the following step SP10. With respect to four points, an error judgment is performed. As a result, when no error is detected, the four points are defined as corner positions. Then, the process moves to step SP11, thereby ending processing. When an error is detected, it is considered that corner detection failed. Then, the process returns to step SP3, thereby repeating processing. For reference, when returning to step SP3, a message is issued to the effect that corner detection failed, and at the same time, a message is issued to the effect that the content of the initial setting is changed.

Incidentally, in a case in which the process moves to step 8 because there are parts showing different points in the corner positions HV1 through HV4 and in the corner positions TLT1 through TLT4, the control circuit 9C judges an error with respect to each of points shown by the corner positions HV1 through HV4 and, at the same time, the control circuit judges an error with respect to each of points shown by the corner positions TLT1 through TLT4. This error judgment method is the same as the error judgment method at step SP10, explained as follows.

Figure 18:
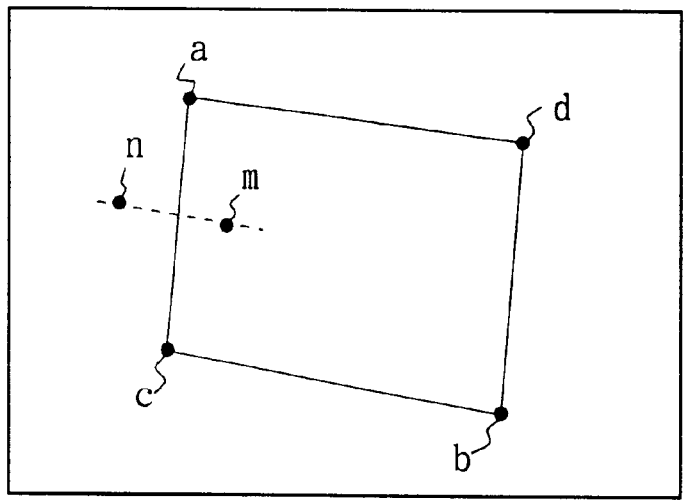
FIG. 18 is a schematic line which is supplied for the explanation of the error judgment with respect to the detected points.
Figure 19:
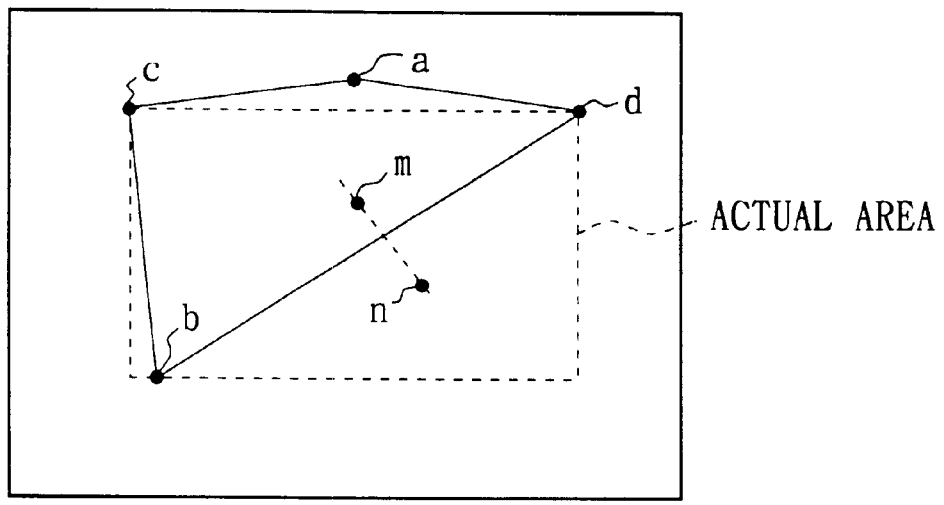
FIG. 19 is a schematic view showing an example in which the detected point is an error.

In other words, as shown in FIG. 18, two points which becomes an object of judgment out of points a, b, c, and d shown by the corner positions HV1 through HV4 are selected. Next, data of two points m and n which exist on a vertical line of connecting straight lines connecting two points for example, on a vertical bisector of the connecting straight line and which exists in an equal distance sandwiching the connection straight lines is read from the frame memory 9B. Then, the signal level of the read two points is examined. As a result, the signal level of one of the two points m and n becomes more than the reference signal level $S_{LEV}$. When the signal level of the other point becomes less than the reference signal level $S_{LEV}$ (when only the signal level on one side out of both sides of the connection straight line becomes more than the reference signal level $S_{LEV}$), it is judged that the two points which are objects of judgment are correct. Furthermore, as shown in FIG. 19, when the signal level of the two points m and n is more or less than the reference signal level $S_{LEV}$ it is judged that two points of the judgment object are errors. This processing is performed with respect to the assemblage of two points out of four points shown at the corner positions HV1 through HV4 and the error judgment is made. However, the assemblage of the two points in this error judgment will be two points which form sides of an area and the two points at which the connection straight line constitutes a diagonal line of the area will be excluded. For example, as shown in FIG. 18, the assemblage of the point a and the point b and the assemblage of the point c and the point d will be excluded.

The error judgment of the corner positions TLT1 through TLT4 is the same.

When the error judgment at step SP8 ends, the control circuit 9C moves to the following step SP9 and the judgment result is examined. As a result, in a case in which the corner positions HV1 through HV4 which are detected in the horizontal scanning and in the vertical direction are correct, and the corner positions TLT1 through TLT4 which are detected in diagonal scanning are errors, and in a case in which the corner positions TLT1 through TLT4 detected in diagonal scanning are correct and the corner positions HV1 through HV4 detected in horizontal and vertical scanning are errors, right corner positions out of the corner positions HV1 through HV4 and the corner positions TLT1 through TLT4 are selected as the corner position. Then, the process moves to step SP11, thereby ending processing.

Furthermore, when the corner positions HV1 through HV4 detected in horizontal and vertical scanning and the corner positions TLT1 through TLT4 detected in diagonal scanning are both correct or errors, it is judged that corner detection failed and the process returns to step SP3, thereby repeating processing. For reference, in returning to step SP3, a message is issued to the effect that corner detection failed and a message is issued which changes the content of the initial setting.

Next, as a result of the judgment of step SP5, four different points are detected by one of the scanning and points other than the four points are detected by the other scanning ("!4" denotes points other than the four points in FIG. 13). In this case, the control circuit 9C considers that corner detection succeeds, thereby selecting the corner positions HV1 through HV4 or the corner positions TLT1 through TLT4 showing four different points, thereby moving to step SP10. Then, after the error judgment is made, the process moves to step SP11, thereby ending processing.

Figure 20A:
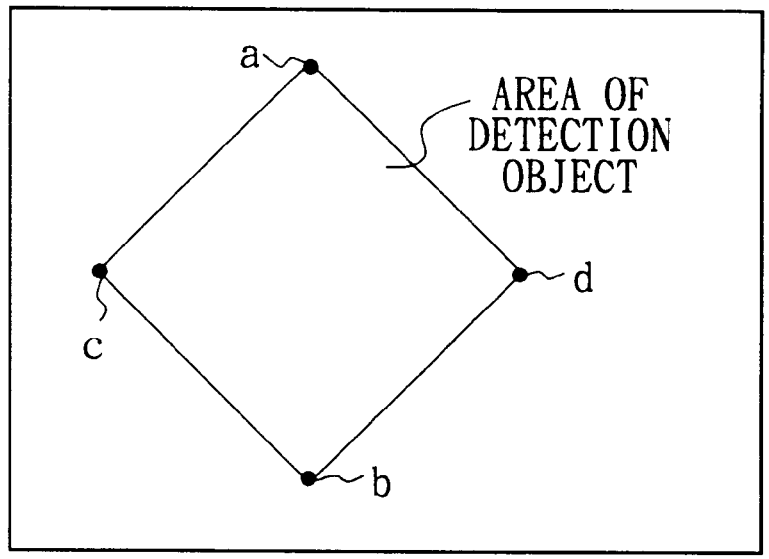
FIGS. 20A and 20B are schematic views showing examples in which four points can be detected only with one-side scanning.
Figure 20B:
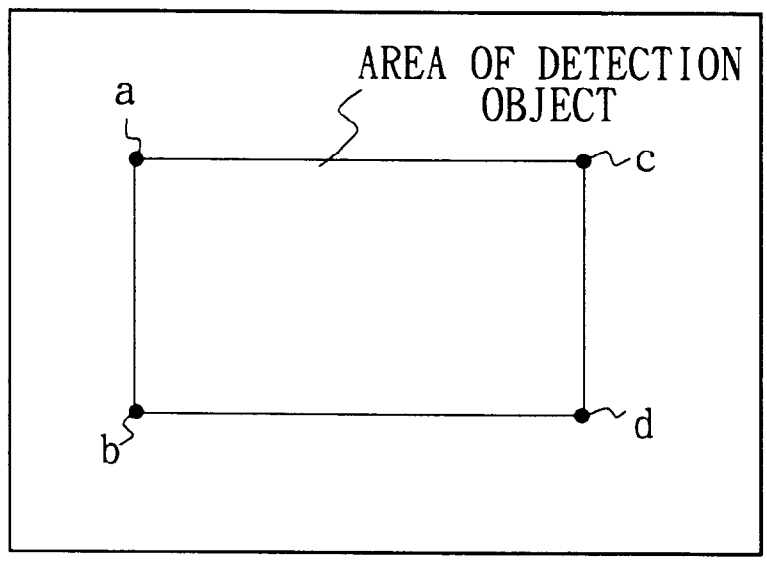

For reference, at the time of this assemblage, the reason why detection succeeds is that when four points cannot be detected in one of the scanning, the four points can be easily detected in the other scanning. For example, as shown in FIG. 20A, when the configuration of the area of the detection object is a diamond, the corner can be easily detected in horizontal and vertical scanning. It is difficult to detect the corners in diagonal scanning. In this case, there is a high possibility that four points a, b, c, and d are detected in the vertical and horizontal scanning while the two points a and b are detected in diagonal scanning. In addition, as shown in FIG. 20B, when the configuration of the area of the detection object is a rectangular, the corner can be easily detected by the horizontal and vertical scanning, but difficult to detect the corners with the diagonal scanning. In this case, four points a, b, c, d are detected by the diagonal scanning, and two points a, b are detected by the horizontal and vertical scanning.

From such a reason, it is judged that detection succeeds at the time of this assemblage, and the corner positions HV1 through HV4 or TLT1 through TLT4 where four points are detected are regarded as corner positions.

Next is explained a case in which three points are detected which differ in horizontal and vertical scanning and in a diagonal scanning as the result of judgment at step SP5. In this case, the control circuit 9C moves from step SP5 to step SP12.

At step SP12, the control circuit 9C examines whether or not there exist four points whose distances are separate in six points shown by the corner positions HV1 through HV4 as well as corner positions TLT1 through TLT4. This method is the same as the judgment method as to whether the point is the same as the point which has been explained above. When the distance between points is examined, and the distance exceeds the reference judgment value, it is judged that points are such that the distances are separate (namely, different points).

As a result, when the four points are detected which have separate distances, the four points are set as the corner position and the process moves to step SP10. Then, after the error is detected, the process moves to step SP11, thereby ending processing. In a case in which the four points whose distances are separate from each other are not detected, the process moves to step SP13, thereby performing a predetermined judgment which will be described later. As a result, it is judged that corner detection failed when an affirmative result is obtained, thereby returning to step SP 3 and repeating processing. When a negative result is obtained, the process moves to step SP14 and thereafter and after to continue corner detection processing.

Figure 21:
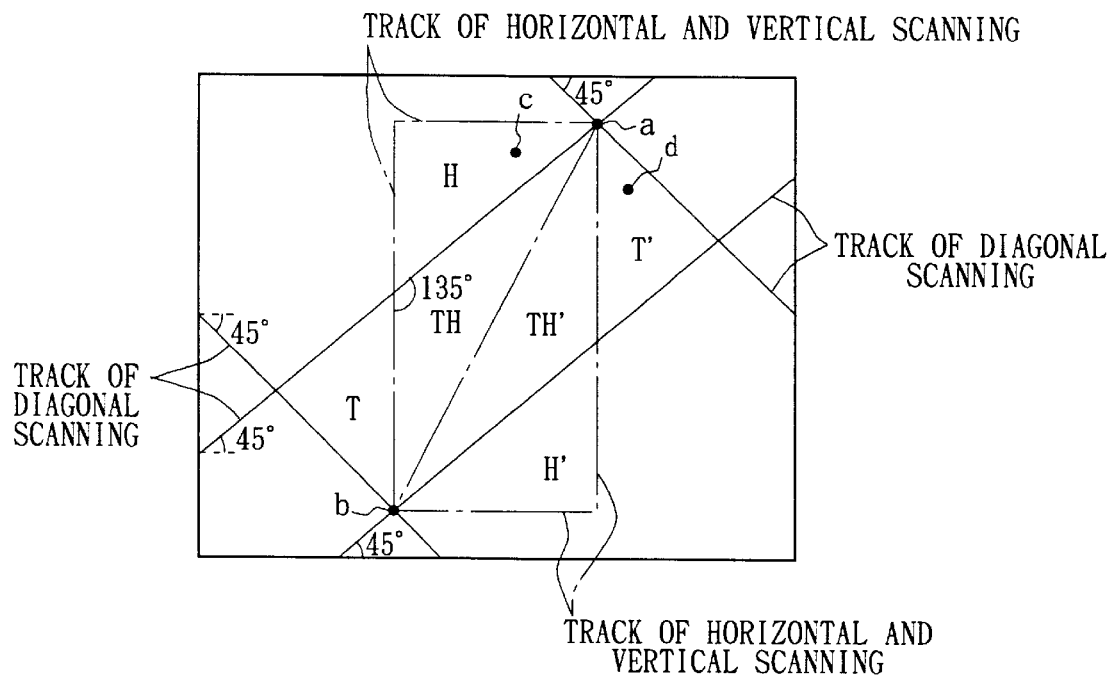
FIG. 21 is a schematic view showing an example in which four corners can be detected by the detection of three points.

For reference, as an example of a case in which the four points whose distances are separate are detected in this manner, a pattern such as that shown in FIG. 21 can be considered. In other words, as shown in FIG. 21, a case is considered in which two corners out of the four corners are located at the positions of points a and b, one corner is located at the position of the point c which exists in an area H (or H') which cannot be detected in the horizontal and vertical scanning and the remaining one corner is located at the position of the point d which exists in an area T' (or T) which cannot be detected in the diagonal scanning. When each corner exists at such positions, only three corners which exist at points a, b, and d can be detected in horizontal and vertical scanning and only three corners which exist at points a, b, and c can be detected in diagonal scanning.

Consequently, in this case, only four corners which exist in points a, b, c, and d can be detected even when the aforementioned distance judgment is made.

Figure 22:
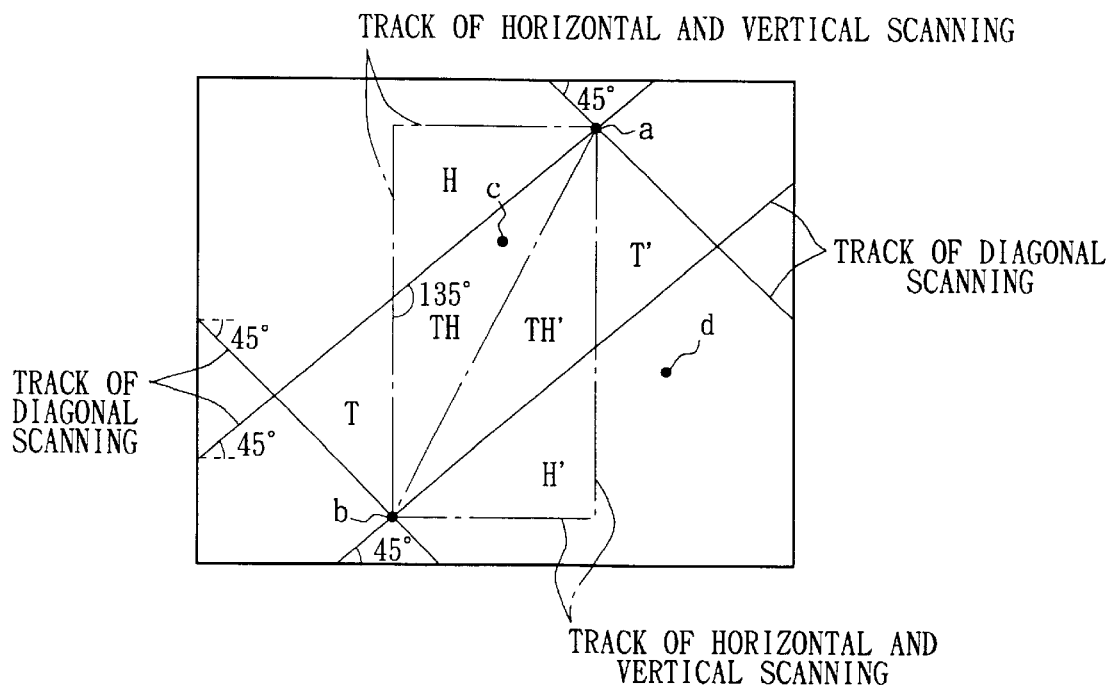
FIG. 22 is a schematic view showing an example in which four corners cannot be detected by the detection of three points.

As an example of a case in which the four points whose distance are separate are not detected, a pattern such as shown in FIG. 22 is considered in which two corners out of the four corners are located at the positions of points a and b, one corner is located at the position of point c which exists in an area TH (or TH') which cannot be detected in both the horizontal and vertical scanning and the diagonal scanning, and the remaining one corner is located at the position of point d which exists in an area which can be detected in the horizontal and vertical scanning and the diagonal scanning. When each corner exists at such positions, only three corners which exist at points a, b, and c can be detected in any of the horizontal and vertical scanning and the diagonal scanning. Consequently, in this case, only three corners can be detected even when the aforementioned distance judgment is made.

As a result of the judgment at the following step SP5, a case is explained in which only two points which differ at least one in horizontal and vertical scanning and in diagonal scanning can be detected.

Figure 23:
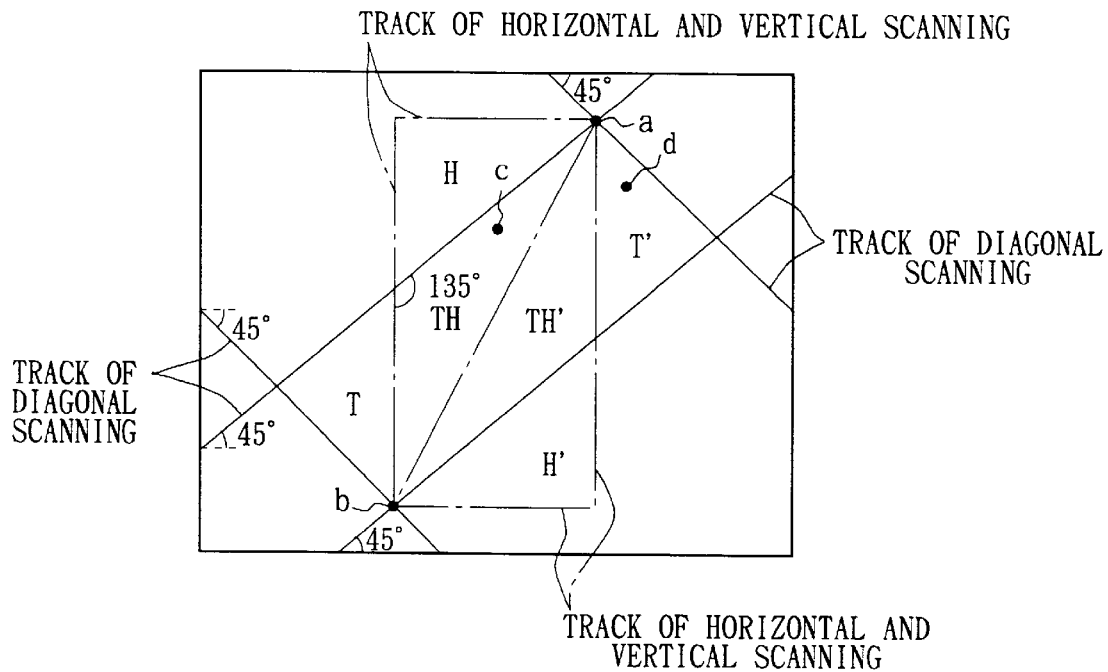
FIG. 23 is a schematic view showing an example in which only two points can be detected in one-side scan.

As an example of such judgment result, a pattern as shown in FIG. 23 can be considered. In other words, as shown in FIG. 23, two corners out of the four corners are located at the positions of points a and b, one corner is located at the position of point c which exists in an area TH (or TH') which cannot be detected in horizontal and vertical scanning and in diagonal scanning remaining one corner is located at the position of point d which exists in an area T' (or T, H, H') which cannot be detected in one of the scanning. When each corner exists at such a position, only two corners which exist at points a and b can be detected in diagonal scanning, and only three corners which exist at points a, b, and d can be detected in horizontal and vertical scanning.

Incidentally, as seen in FIG. 23, when the corner exists in the area TH (or TH') which cannot be detected in horizontal and vertical scanning and in diagonal scanning, the area of the corner-detection object has an inside angle of 135 degrees or more.

In a case in which only two points can be detected in one of the scanning, the control circuit 9C moves from step SP 5 to step SP 13. At step SP 13, the control circuit 9C examines the detection condition given in the initial setting. As a result, when the detection result is set so that only the corners having an inside angle of 135 degrees or less can be detected, it is considered that corner detection failed, and processing is repeated at step SP 3. When the initial setting is set so that the corner having an inside angle of 135 degrees or more can be detected, the process moves to step SP 14.

Figure 24:
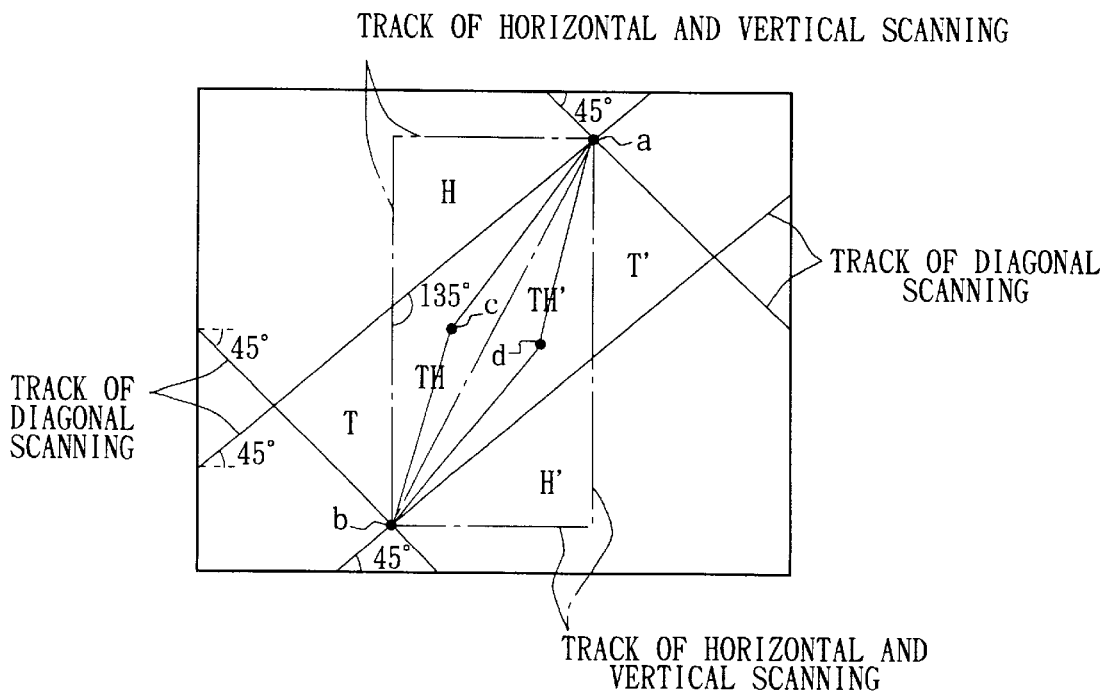
FIG. 24 is a schematic view showing an example in which an area of a detection object has an inside angle of 135 degrees or more.

For reference, in almost all cases, the detection condition is set in such a way that only the corner having an inside angle of 135 degrees or less can be detected. In devices for inserting a source video signal $V_{in}$ into an area which is determined in corner detection such as a video signal processing device 1 is meaningless even when the square area which is extremely deformed is detected. This is because, as shown in FIG. 24, when the areas a, b, c, and d which has an inside angle of 135 degrees or more is detected and the source video signal $V_{in}$ is inserted into the areas a, b, c, and d, it is feared that the source video signal $V_{in}$ cannot be detected. However, even if the source video signal $V_{in}$ cannot be detected, this is not the case in a case in which the source video signal $V_{in}$ is used for the special effect of the image signal.

Since it is set that the corner having an inside angle of 135 degrees or more can be detected, the control circuit 9C examines an assemblage as to whether how many different points are detected in horizontal and vertical scanning as well as in diagonal scanning when moving to step SP14. As a result, three points are detected both in horizontal and vertical scanning as well as in diagonal scanning, and when the three points are detected in one of the scanning and two points are detected in the other scanning, the process moves to step SP 15. In contrast, when only two points can be detected in horizontal and vertical scanning as well as in diagonal scanning, the process moves to step SP 17.

For reference, as an example of a case in which the three points can be detected in both scannings, it is considered that there is a case in which one corner exists in the area TH (or TH') which cannot be detected in horizontal and vertical scanning as well as in diagonal scanning. Furthermore, as an example in which three points are detected in one of the scanning and two points are detected in the other scanning, as shown in FIG. 23, it is considered that one corner exists in the areas T and H (T' and H') which cannot be detected in one of the scanning. Furthermore, as an example of a case in which only two points can be detected in both scannings, as shown in FIG. 24, it is considered that one corner exists in TH (or TH') which cannot be detected in horizontal and vertical scanning as well as in diagonal scanning while the other corner exists in the area TH which cannot be detected in horizontal and vertical scanning as well as in diagonal scanning while the other corner exists in the area TH' which cannot be detected in horizontal and vertical scanning and diagonal scanning, or two corners exist in the area TH or TH' which cannot be detected in horizontal and vertical scanning as well as in diagonal scanning.

At step SP 15, a diagonal line of the area of the detection object is detected from the detected three points. At that time, in a case in which three points are detected, the same point is detected so that one point obtained from one of the scanning is used. Incidentally, in a case in which three points are detected in one of the scanning and two points are detected in the other scanning, the point obtained in the scanning in which three points are detected is used.

Figure 25:
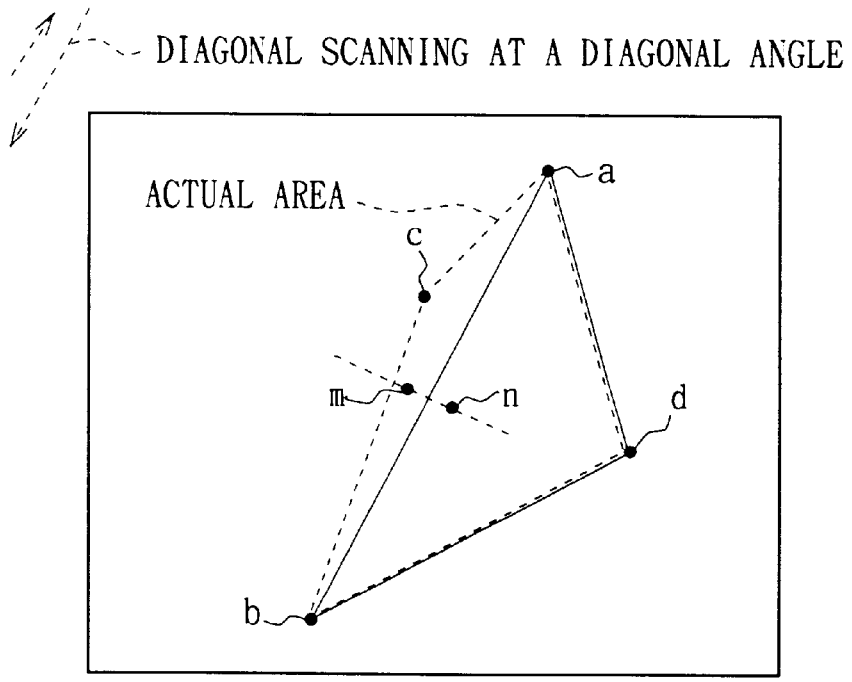
FIG. 25 is a schematic view which is supplied for the explanation of a method for detecting a diagonal line.

Furthermore, as a method for detecting the diagonal line, two points which are the judgment objects out of the three points are selected. Data of the two points m and n which exists on the vertical line of the connection straight lines connecting the two points (for example, on a vertical bisector of the connecting straight line) and exist in an equal distance sandwiching the connection straight lines is read from the frame memory 9B and the signal level of the read two points m and n is examined. As a result, as shown in FIG. 25, when the signal level of the two points is more than the reference signal level $S_{LEV}$, it is judged that a diagonal line is formed with the two points which are object of judgment. Processing is performed with respect to each of the two points out of the three points, thereby detecting the diagonal line.

When the diagonal line is detected, the process moves to the next step SP 16, at which diagonal scanning is performed at an angle of this diagonal line, thereby detecting the fourth point. At this time, when the scope of the angle of diagonal line is within the scope of 0 through 90 degrees, diagonal scanning is performed from an angle where it seems that the fourth point exists out of the left upper angle or the right lower angle (that is, the corner opposite to the corner where the third point is disposed), and diagonal scanning is started from an angle where it seems that the fourth point exists out of the right upper angle or the left lower angle when the angle of the diagonal line is within the scope of 0 to −90 degrees. Thus, at step SP 16, the diagonal line is performed at an angle of the diagonal line to detect the fourth point. When the fourth point is detected in this processing, the fourth point and the previous three points are defined as corner positions. Then, the process moves to step SP 10 to make an error judgment which is followed by moving to step SP 11, thereby ending processing.

Incidentally, when the diagonal line is performed at an angle of the diagonal line, the ratio of the reading address which is shifted in the horizontal direction and in the vertical direction is changed in accordance with the angle so that diagonal scanning can be easily performed.

Incidentally, since only two points can be detected in both scanning, it is examined whether or not the detected two points form a diagonal line of the area of the detection object in a case in which the process moves to step SP 17. The method is the same as the method for detecting the diagonal line. Data of the two points m and n which exists on the vertical line of the connection straight line connecting the two points (for example, on a vertical bisector of the connecting straight line), and which exists in an equal distance sandwiching the connection straight lines is read from the frame memory 9B and the signal level of the read two points is examined. As a result, when the signal level of the two points m and n is more than the reference signal $S_{LEV}$ it is judged that a diagonal line is formed, and the process moves to step SP 18. When the signal level of one point out of the two points m and n is not the reference signal $S_{LEV}$ or more, it is judged that the diagonal line is not formed, and the process moves to step SP 19.

At step SP 18, the diagonal scanning is performed at an angle of the diagonal line which is formed with the two points, and the third and the fourth points are detected. At this time, when the angle of the diagonal line is within the scope of 0 to 90 degrees diagonal scanning is started from the left upper angle and the right lower angle. When the diagonal line is within the scope of 0 to −90 degrees, the diagonal line is started from the right upper angle and the left lower angle. In this manner, at step SP 18, diagonal scanning is performed at the angle of the diagonal line formed by the two points to detect the third and the fourth points. When the third and the fourth points are detected in this processing, the third point, the fourth point and the previous two points are defined as the corner position. After the error judgment is performed moving to step SP 10, the process moves to step SP 11 to end processing.

Incidentally, in a case in which the process moves to step SP 19 because the two points do not form the diagonal line, diagonal scanning is performed at an angle of the connection straight lines connecting the two points to detect the third point. At this time, when the angle of the connection straight line is within the scope of 0 through 90 degrees, diagonal scanning is started from the angle where the third point seems to exist out of the left upper angle and the right lower angle (in other words, an angle where there is a point which has a reference signal level $S_{LEV}$ or more in the judgment at step SP 17) so that diagonal scanning is started from an angle where the third point exists out of the right upper angle or the left lower angle when the angle of the connection straight lines are within the scope of 0 to −90 degrees. In this manner, at step SP 19, diagonal scanning is performed at an angle of the connection straight lines connecting the two points to detect the third point. When the third point is detected in this processing, the diagonal line of the area of the detection object is detected from the third point and the two previous points. Then, at step SP 21, the fourth point is detected in diagonal scanning at an angle of the diagonal line. When the third point and the fourth point are detected in such processing, the third point, the fourth point and the two previous points are defined as corner positions. After the error judgment is made moving to step SP 10, the process moves to step SP 11, thereby ending processing.

In this manner, in this corner detector 9, data of the target key signal keyT which is stored in the frame memory 9B is read in horizontal and vertical directions, and at the same time, data is read in the diagonal direction comprising a predetermined angle so that the positions HV1 through HV4 and TLT1 through TLT4 are analyzed in the predetermined judgment procedure to detect the four corner positions of the area of the detection object HV1 through HV4 and TLT1 through TLT4. Furthermore, when the four corners cannot be detected in the reading in the horizontal and vertical direction as well as in the diagonal direction, data is read in the diagonal direction at a second angle which is different from the predetermined angle which is described above to detect the corner position.

(5) Operation and Advantage of the Embodiment

In the aforementioned structure, in this video signal processing device 1, a blue plate 6 is installed as an insertion place of the source video image at the background of the anchorperson 4, the blue plate 6 is photographed with a video camera 2 together with the news anchorperson 4 of the photograph object so that the studio video signal $V_{BK}$ is generated. This studio video signal $V_{BK}$ is supplied to the chromakey device so that the target key signal keyT showing an area having a color tone of blue color is generated. The corner detector 9 receives this target key signal keyT and detects the four corner positions A, B, C, and D shown by the blue plate 6 based on the target key keyT and an address signal S1 showing the position is supplied to the address generator 11.

Incidentally, the source video signal $V_{in}$ generated by the reproduction by the video tape recorder 12, or the photograph by the video camera 13 is supplied to the image converter 16 and is written to the memory 16B provided inside of the image converter 16. Furthermore, the source video signal $V_{in}$ is also supplied to the monitor 17 and is displayed on the monitor 17. An operator who operates the video signal processing device 1 operates the input device 10 while watching the source video signal $V_{in}$ displayed on the monitor 17 to designate a scope of the selected image area IJKL which is embedded in the square ABCD of the studio video signal $V_{BK}$. This scope designation information is sent from the input device 10 to the controller 18. The controller 18 detects the position of four corners, I, J, K, and L, of the selected image area IJKL based on scope designation information. The address signal S2 showing the position is supplied to the three-dimensional conversion address generator 11 and the self-key generator 19.

The three-dimensional conversion address generator 11 calculates a conversion address for image conversion of the selected image area IJKL into the same configuration as the square ABCD based on an address signal S1 showing four corner positions of the square ABCD supplied from corner detector 9 and an address signal S2 showing the four corners position of the selected image area IJKL supplied from the controller 18. The three-dimensional conversion address generator 11 determines the conversion matrix $T_{33}$ of the three dimensional conversion processing based on the position vector of four corners of the square ABCD and the position vector of four corners of the selected image area IJKL at first to conversion address. Next, the three-dimensional conversion address generator 11 uses each of the parameters of the conversion matrix $T_{33}$ to determine the reverse matrix $T_{33}^{-1}$ of the conversion matrix $T_{33}$ to perform calculation based on each parameter of this reverse matrix $T_{33}^{-1}$ and a screen address $(X_S, Y_S)$ from the screen address generator 22 to determine sequentially conversion address $(X_M, Y_M)$, and supplies this conversion address to the image converter 16 and the converter 20 as the conversion address signal S4.

The image converter 16 reads sequentially the source video signal $V_{in}$ written to the memory 16B based on the conversion address signal S4. As a result, the source video signal $V_{out}$ is generated to which the three-dimensional conversion processing is performed to be able to be inserted into the square ABCD of the studio video signal $V_{BK}$.

Furthermore, the self-key generator 19 receives an address signal S2 showing a four corner positions I, J, K, and L of the selected image area IJKL from the controller 18, and generate based on the address signal S2 the self-key signal S5 in which an area corresponding to the configuration of the selected image area IJKL comprises a signal of "1" and the other area comprise a signal level of "0". The converter 20 writes this self-key signal S5 in the internal memory, and reads it based on the conversion address signal S4 supplied from the three-dimensional conversion address generator 11. As a result, a self-key signal $K_{out}$ is generated in which the area having the signal level of "1" is converted to the same configuration as the square ABCD.

The mixer 8 changes over and outputs the source video signal $V_{out}$ which is subjected to image conversion and the studio video signal $V_{BK}$ based on the self-key signal $K_{out}$. In other words, when the signal level of the self-key signal $K_{out}$ is set to "0", the studio video signal $V_{BK}$ is selected and output. When the signal level of the self-key signal $K_{out}$ is "1", the source video signal $V_{out}$ is selected and output. As a result, a synthesized video signal $V_{mix}$ is generated in which the source video signal $V_{out}$ is inserted into the square ABCD of the studio video signal $V_{BK}$.

Figure 26A:
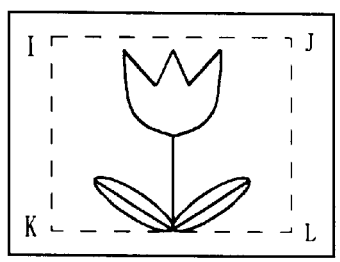
FIGS. 26A to 26C are schematic views showing images of a video signal at each process at the time when the source video signal $V_{in}$ is inserted into the studio video signal $V_{BK}$.
Figure 26B:
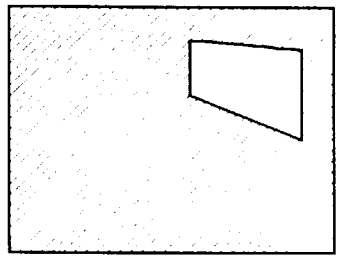
Figure 26C:
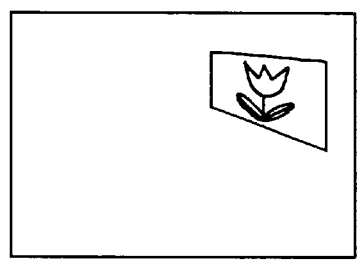
Figure 27A:
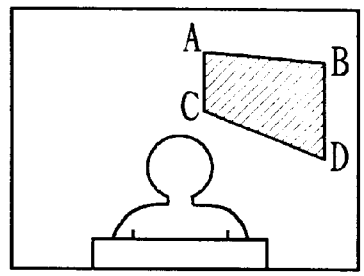
FIGS. 27A to 27C are schematic views showing images of a video signal at each process at the time when the source video signal $V_{in}$ is inserted into the studio video signal $V_{BK}$.
Figure 27B:
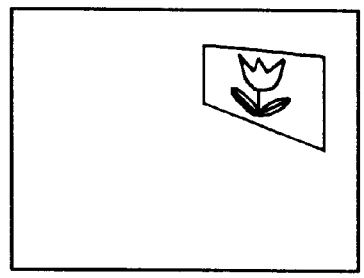
Figure 27C:
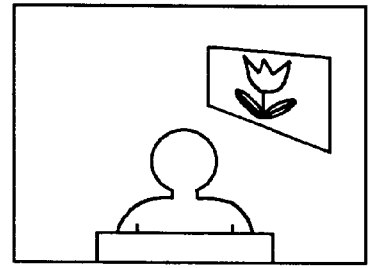

An image of each video signal is shown in FIGS. (26A to 26C) and (27A to 27C). As shown in FIGS. 26A to 26C, a part designated as the selected image area IJKL out of the source video signal $V_{in}$ is image converted based on the target key signal keyT showing a configuration of the square ABCD. As shown in FIG. 26C, the configuration of the square ABCD is converted to the square ABCD. This converted source video signal $V_{out}$ is synthesized in the square ABCD of the studio video signal $V_{BK}$ so that a synthesized video signal $V_{mix}$ is generated, in which the selected image area IJKL is inserted into the square ABCD as shown in FIGS. 27A to 27C.

In this manner, this video signal processing device 1 detects the four corner positions of the square ABCD from the studio video signal $V_{in}$ and calculates the conversion matrix $T_{33}$ for image conversion based on the position information showing the detected position and the position information showing four corner positions of the selected image area IJKL to be inserted. Then, the video signal processing device 1 determines the reverse matrix $T_{33}^{-1}$ of the conversion matrix $T_{33}$ by using each parameter of the conversion matrix $T_{33}$, calculates the conversion address for image conversion based on each parameter of the reverse matrix $T_{33}^{-1}$ and screen address, and reads the source video signal $V_{in}$ written to the memory 16B of the image converter 16 based on the conversion address. As a result, this video signal processing device 1 is capable of automatically generating the source video signal $V_{out}$ having a source video image which agrees with a predetermined frame (ABCD) of the background of the news anchorperson 4 even if the operator does not input a parameter showing the configuration after the conversion by using a track ball or the like as can be seen in the prior art. Consequently, the operator may only perform a simple operation of designating the selected image area IJKL which is inserted into the studio video signal $V_{BK}$ (even this operation is not needed if the source video signal $V_{in}$ as a whole is inserted). A complicated manual operation for allowing the conventional source video image to accurately agree with the predetermined frame (ABCD) will not be needed, and the operation of the operator can be reduced as compared with the prior art.

Furthermore, the corner detector 9 detects a point where the signal level becomes the reference signal $S_{LEV}$ or more at first by reading data of the target key signal keyT which is stored in the frame memory 9B sequentially in the horizontal direction from the upper and lower limit of the retrieval scope and reading data sequentially in the vertical direction from the left end and the right end of the retrieval scope, detects the point where the signal level becomes the reference signal level $S_{LEV}$ or more at first by reading data of the target key signal keyT which is stored in the frame memory 9B sequentially in the diagonal direction from an angle of 45 or −45 degrees from each angle of the retrieval scope, and detects the corner position by searching for four points having different positions from these detected points. By doing so, the corner detector 9 can detect four corner positions of the area of the square with a simple structure and quickly.

Furthermore, when the corner detector 9 cannot detect the four corner positions in the reading in the horizontal and vertical direction and in the reading in the diagonal direction, the corner detector 9 detects the diagonal line of the area from the point obtained in the detection, and detects the corner position which cannot be detected by reading in a diagonal direction at the angle of the diagonal line. Furthermore, in a case in which the diagonal line cannot be detected, the corner position is detected which cannot be detected by reading in the diagonal line at an angle of the straight line connected two points. As a result, in a case in which the area is deformed into any configuration, the four corner positions can be detected with certitude.

In the aforementioned structure, the point is detected where the signal level of the target key signal keyT becomes the reference signal level $S_{LEV}$ or more at first by reading data in the horizontal direction sequentially from the upper and lower limit of the retrieval scope and sequentially in the vertical direction from the left and right ends of the retrieval scope followed by detecting the point where signal level of the target key signal keyT becomes the reference signal level $S_{LEV}$ or more at first by reading data sequentially in the diagonal direction at an angle of 45 degrees or −45 degrees from each angle of the retrieval scope and detecting the corner position by searching for four points having different positions from these detected points. Thus, four corner positions of the square area can be detected quickly in simple structure. Thus the video signal processing device 1 can be realized which is capable of automatically inserting the source video image into the predetermined frame of the background of the anchorperson even if the operator does not input the corner position or the like.

(6) Other Embodiments (6-1) Incidentally, in the aforementioned embodiment, there is described a case in which the monitor 17 displays the source video signal $V_{in}$ and the selected image area IJKL is designated while watching the screen of the source video signal $V_{in}$ displayed on the monitor 17. However, the present invention is not limited thereto. The similar effect as the aforementioned case can be obtained even when the monitor 17 is not provided and only a monitor 21 displaying the synthesized video signal $V_{mix}$ is provided, and the selected image area IJKL is designated while watching the screen of the synthesized video signal $V_{mix}$ displayed on the monitor 21.

A method for designating the selected image area IJKL while watching this monitor 21 will be specifically explained hereinbelow. The scope designation information of the selected image area IJKL is such that plus 100 percent and minus 100 percent is set in the horizontal direction from the center of the effective image area EFGH and plus 100 percent and minus 100 percent are set in the vertical direction as default values, and the whole effective image area EFGH is designated as the selected image area IJKL. Therefore, immediately after the video signal processing device 1 is operated, the monitor 21 displays a synthesized video signal $V_{mix}$ wherein an effective image area EFGH is inserted into the predetermined frame ABCD of the background of the anchorperson 4 as shown in FIG. 7.

The operator operates a scope designation volume and a keyboard of the input device 10 while watching the screen of the synthesized video signal $V_{mix}$ displayed on this monitor 21 to input scope designation information for designating the selected image area IJKL. For example, in a case in which the scope designation volume is operated to continuously change the scope designation information of the selected image area IJKL, the scope of the selected image area IJKL displayed on the monitor 21 continuously changes. The operator observes the change in the scope of this selected image area IJKL and suspends the input operation when the scope of the desired selected image area IJKL is displayed and the scope designation volume is fixed. By such operation, the desired selected image area IJKL can be inserted into the predetermined frame ABCD of the background of the anchorperson.

Furthermore, it is possible to directly input a value of scope designation information by using a keyboard in place of the scope designation volume. In this case, for example, plus 80 percent and minus 80 percent from the center of the effective image area EFGH is input as the scope designation information in the horizontal direction, and plus 80 percent and minus 80 percent from the center of the effective image area EFGH is input in the vertical direction with the result that the scope of the selected image area EFGH is selected as the selected image area IJKL. Consequently, the monitor 21 displays the synthesized video signal $V_{mix}$ in which the selected image area IJKL thus selected is inserted into the predetermined frame ABCD of the background of the anchorperson 4.

For reference, in a case in which such scope designation is performed, the operation of the controller 18 is basically the same except that a display control to the monitor 17 is absent. In other words, the controller 18 detects the four corner positions of the selected image area IJKL based on scope designation information received from the input device 10, and the address signal S2 showing the position is output.

Figure 28:
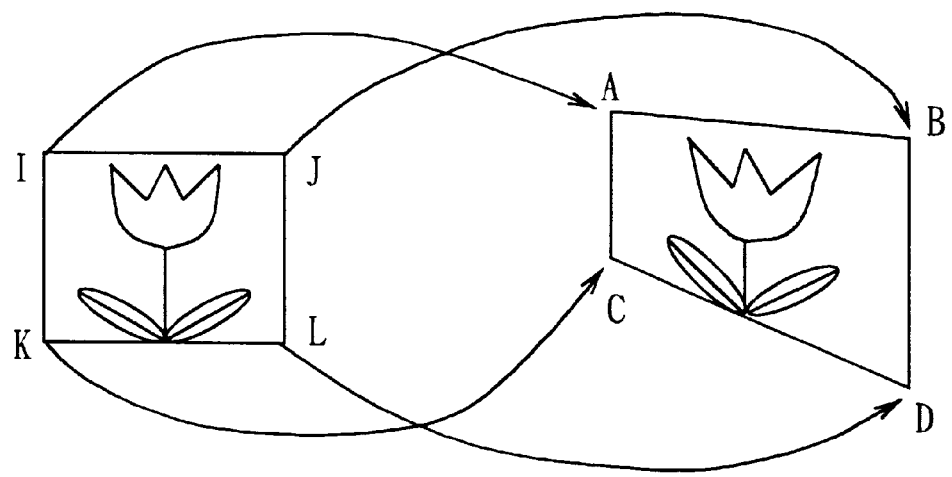
FIG. 28 is a schematic view which is supplied for the explanation of a case where the source video signal is inserted into the square ABCD without rotating the selected image area IJKL.

(6-2) Furthermore, in the aforementioned embodiment, as shown in FIG. 28, a case is described in which the selected image area IJKL is inserted into the square ABCD so that the corners I, J, K, and L of the selected image area IJKL correspond to the corners A, B, C, and D of the square ABCD. However, the present invention is not limited thereto. The selected image area IJKL may be inserted so as to change the direction thereof by shifting the correspondence relationship through 90 degrees.

There will be specifically explained a method for inserting the selected image area IJKL by changing the direction thereof. The operator inputs direction information showing a correspondence relationship between each corner of the selected image area IJKL and each corner of the square ABCD together with the scope designation information for designating the selected image area IJKL via the input device 10. As direction information, a rotation angle for allowing the corners to correspond to each other by rotating the selected image area IJKL is input. Incidentally, for the ample of rotation, a rightward direction is defined as a positive direction and the leftward direction is defined as the minus direction.

For example, when plus 90 degrees is input together with scope designation information as direction information from the input device 10, the controller 18 receives the information. Then, the controller 18 detects the four corner positions of the selected image area IJKL based on the scope designation information. Together with the address signal S2 showing the position, direction information is sent to the three-dimensional address conversion address generator 11.

Figure 29:
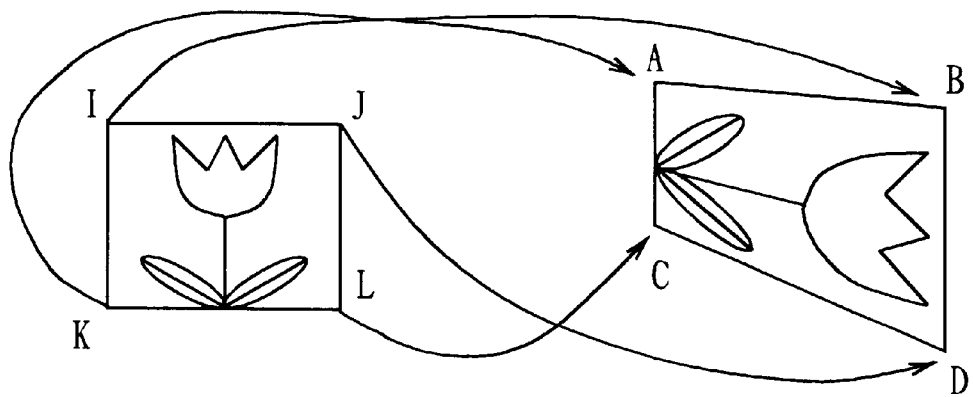
FIG. 29 is a schematic view which is supplied for the explanation of a case where the source video signal is inserted into the square ABCD by rotating the selected image area IJKL through 90 degrees in the rightward direction.

The three-dimensional conversion address generator 11 generates by calculation a conversion address (in other words, the conversion address for rotating the selected image area IJKL by 90 degrees to correspond) for allowing the selected image area IJKL to agree with the square ABCD as shown in FIG. 29 based on the address signal S1 showing the four corner positions of the square ABCD supplied from the corner detector 9, an address signal S2 showing the four corner positions of the selected image area IJKL supplied from the controller 18 and the direction information showing plus 90 degrees. Thus, this conversion address is supplied to the image converter 16 and the converter 20 for key signal so that the synthesized video signal $V_{mix}$ is generated in which the selected image area IJKL is inserted in the state of being rotated by 90 degrees in the rightward direction.

Figure 30:
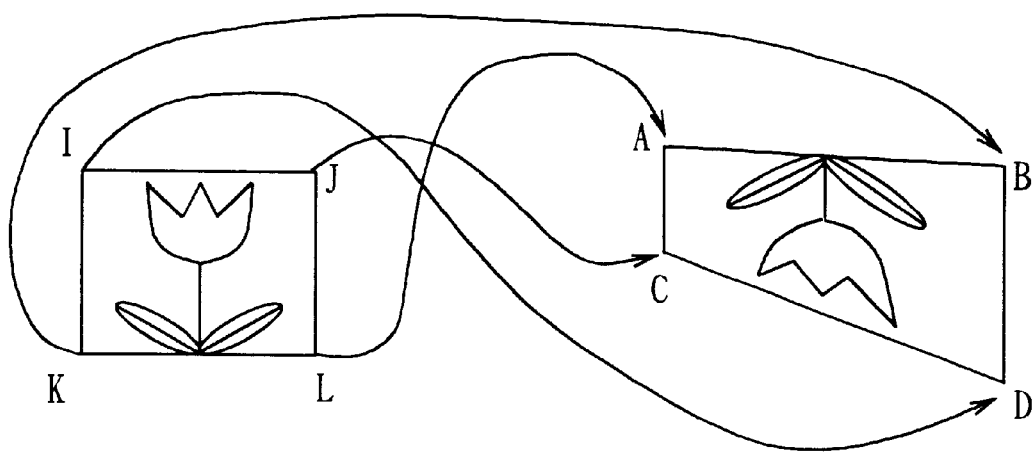
FIG. 30 is a schematic view which is supplied for the explanation of a case where the source video signal is inserted into the square ABCD by rotating the selected image area IJKL through 180 degrees in the rightward direction.

Furthermore, in a case in which the direction information showing plus 180 degrees is input as direction information from the input device 10, the direction information showing plus 180 degrees is supplied to the three-dimensional conversion address generator 11 together with the address signal S2 showing four corner positions of the selected image area IJKL by the controller 18. The three-dimensional conversion address generator 11 generates by calculation a conversion address (in other words, a conversion address for rotating the selected image area IJKL by 180 degrees to correspond) for allowing the selected image area IJKL to agree with the square DCBA as shown in FIG. 30 based on the address signal S1 showing four corner positions of the square ABCD supplied from the corner detector 9, the address signal S2 showing the four corner positions of the selected image area IJKL supplied from the controller 18, and direction information showing plus 180 degrees. Thus, this conversion address is supplied to the image converter 16 and the converter 20 for the key signal so that the synthesized signal $V_{mix}$ is generated in the state in which the selected image area IJKL is inserted in the state of being rotated by 180 degrees in the rightward direction.

Figure 31:
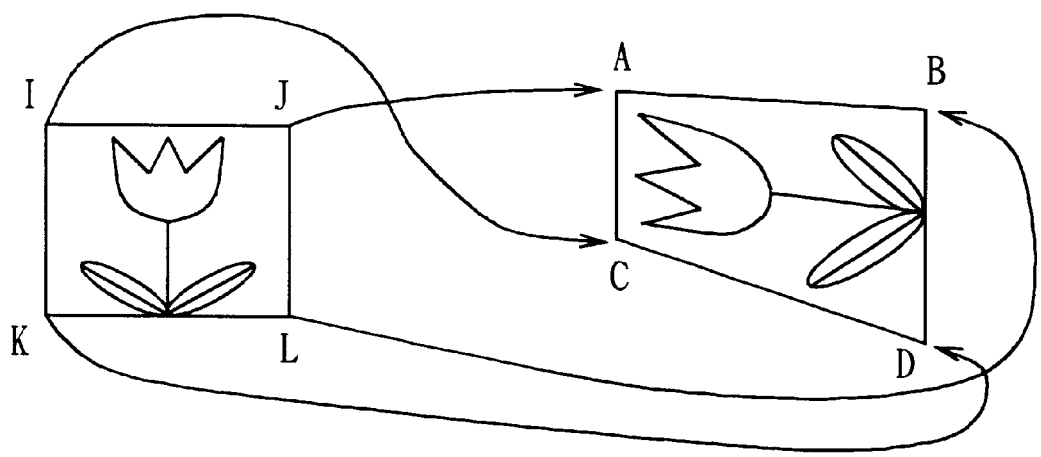
FIG. 31 is a schematic view which is supplied for the explanation of a case where the source video signal is inserted into the square ABCD by rotating the selected image area IJKL through 270 degrees in the rightward direction.

Furthermore, in a case in which direction information showing plus 270 degrees is input as direction information from the input device 10, the controller 18 supplies direction information showing this plus 270 degrees to the three-dimensional conversion address generator 11 together with the address signal S2 showing the four corner positions of the selected image area IJKL. The three-dimensional conversion address generator 11 generates by calculation the conversion address (in other words, a conversion address for rotating the selected image area IJKL by 270 degrees to correspond) for allowing the selected image area IJKL to agree with the square CADB as shown in FIG. 31 based on the address signal S1 showing four corner position of the square ABCD supplied from the corner detector 9, the address signal S2 showing the four corner positions of the selected image area IJKL supplied from the controller 18 and direction information showing plus 270 degrees. Thus, this conversion address is supplied to the image converter 16 and the converter 20 for the key signal so that the synthesized video signal $V_{mix}$ is generated in which the selected image area IJKL is inserted in the state of being rotated by 270 degrees in the rightward direction.

Figure 32A:
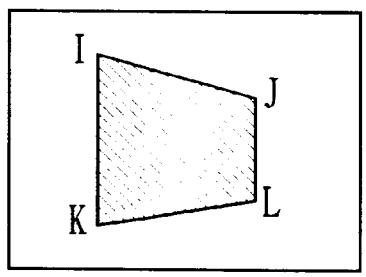
FIGS. 32A to 32C are schematic views which are supplied for the explanation of a case where an arbitrary configuration is designated as the selected image area IJKL.
Figure 32B:
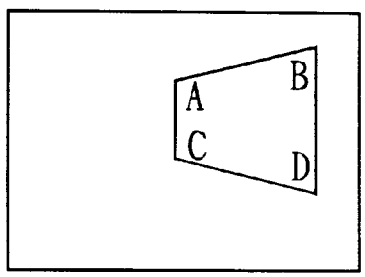
Figure 32C:
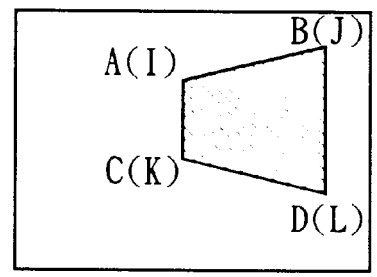

(6-3) Furthermore, in the aforementioned embodiment, a case is explained in which a rectangular or a square selected image IJKL is designated by inputting the scope designation informations in the horizontal and vertical directions. The present invention is not limited thereto. For example, an input device 10 such as a keyboard or the like is used to independently designate the position of each of the corners I, J, K, and L of the selected image area IJKL. By doing so, as shown in FIGS. 32A to 32C, the selected image area IJKL having an arbitrary configuration other than a simple rectangle or a square can be inserted into the square ABCD and usage can be improved.

Figure 33:
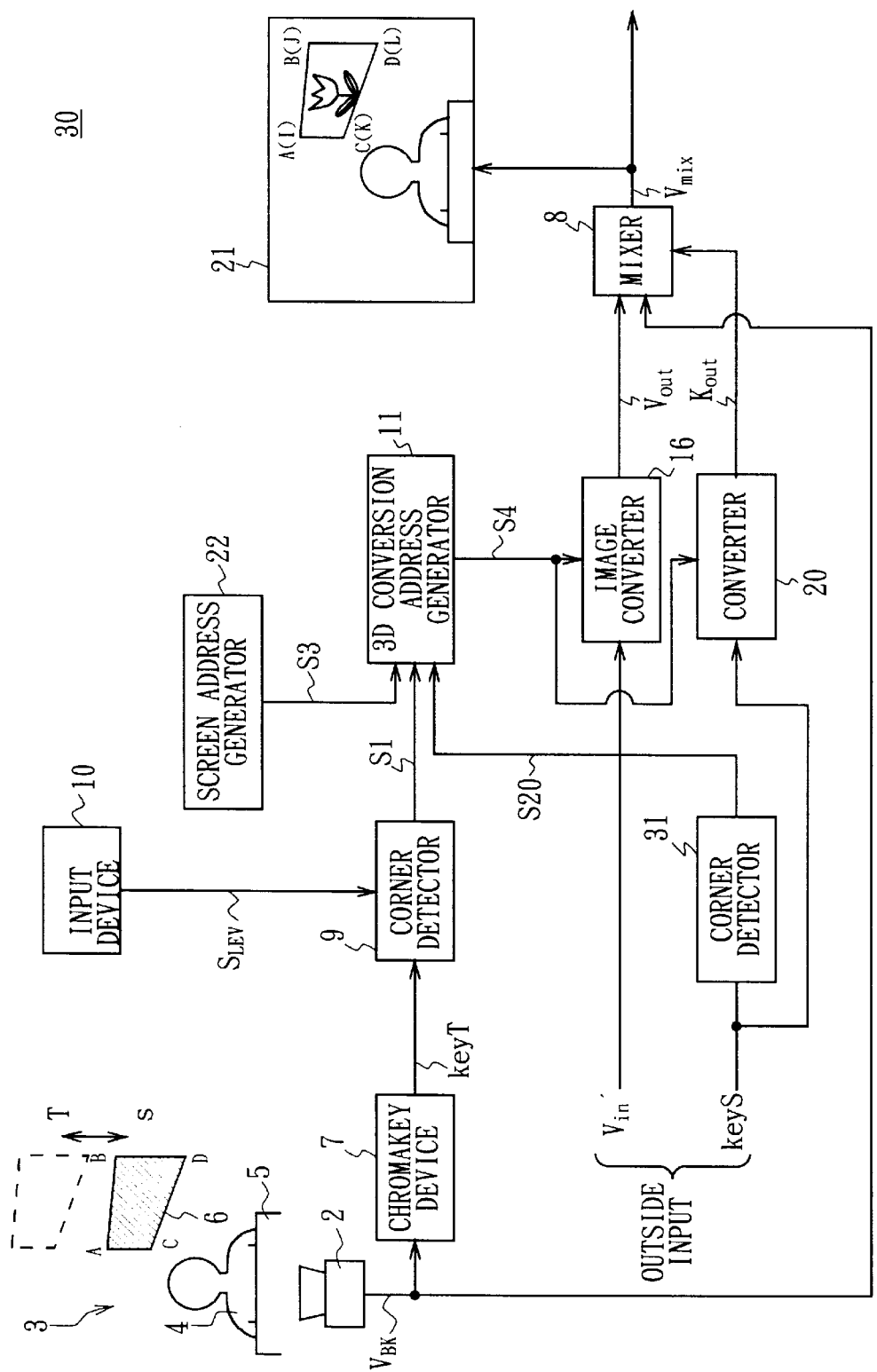
FIG. 33 is a block diagram showing a structure of a video signal processing device according to another embodiment.

(6-4) Furthermore, in the aforementioned embodiment, a key signal (S5) showing the configuration of the source video image to be inserted is generated inside the video signal processing device 1. However, the present invention is not limited thereto. The key signal may be received from an outside device. The structure of the video signal processing device in this case is shown in FIG. 33 wherein parts corresponding to FIG. 1 are denoted with the same reference numerals.

When this video signal processing device 30, the source video signal $V_{in}'$ to which a different image conversion processing is subjected with an outside device (not shown) is input. This source video signal $V_{in}'$ is supplied to the image converter 16 in a manner similar to the video signal processing device 1 shown in FIG. 1 to be written sequentially in the memory inside of the image converter 16. Furthermore, when this video signal processing device 30, the key signal keyS which is generated by the outside device together with the source video signal $V_{in}'$ is input. This key signal keyS is a signal showing a configuration of an area which is inserted into the square ABCD as the source video image out of the source video signal $V_{in}'$. In the area corresponding to the image area to be inserted, the signal level is set to "1" and the signal level is set to "0" outside of the area. This key signal keyS is input to the corner detector 31 and the converter 20.

The corner detector 31 has almost the same structure as the corner detector 9 for detecting the corner of the target key signal keyT. The corner detector detects the four corner positions of the key signal keyS and supplies the address signal S20 showing the position in the display coordinate of the four corners to the three-dimensional conversion address generator 11.

The three-dimensional conversion address generator 11 calculates the conversion matrix for inserting the source video signal $V_{in}'$ into the square ABCD based on the address signal S1 showing the four corner positions of the square ABCD supplied from the corner detector 9, and the address signal S20 showing the four corner positions of the key signal keyS supplied from the corner detector 31. Then, the three-dimensional conversion address converter 11 calculates the conversion address based on the reverse matrix of the conversion matrix and the screen address signal S3 from the screen address generator 22. In other words, when the video signal processing device 30, four corner position information of the key signal keyS detected by the corner detector 31 is used to determine the conversion address in place of four corner position information of the selected image area IJKL.

The determined conversion address is supplied to the image converter 16 and the converter 20 for the key signal as the conversion address signal S4. The image converter 16 reads the source video signal $V_{in}'$ written to the inside memory based on the conversion address obtained with the conversion address signal S4 to generate the source video signal $V_{out}$ which is image converted. Similarly, the converter 20 reads the key signal keyS written to the inside memory based on the conversion address obtained with the conversion address S4 to generate the key signal $K_{out}$ in which the area having a signal level of "1" is converted to the same configuration with the square ABCD. Thus, the mixer 8 generates the synthesized video signal $V_{mix}$ where the source video signal $V_{in}'$ is inserted by selecting and outputting the source video signal $V_{out}$ and the studio video signal $V_{BK}$.

(6-5) Furthermore, in the aforementioned embodiment, a case is explained in which the source video image is inserted into the square ABCD. However, the present invention is not limited thereto. When there are at least four or more corners, each parameter of the conversion matrix $T_{33}$ can be calculated, and the source video image may be inserted into a polygon having four or more corners.

(6-6) Furthermore, in the aforementioned embodiment a case is described in which the blue plate 6 is retreated by using a lifting mechanism when not inserting the source video signal $V_{in}$. However, the present invention is not limited thereto. The studio staff and the like may retract the blue plate 6.

(6-7) Furthermore, in the aforementioned embodiment a case is described in which four corner positions are determined by determining an average value of corresponding points when the corner positions HV1 through HV4 and TLT1 through TLT4 show the same point at the time of the detection of the corner positions as shown at step 7 in FIG. 14. However, the present invention is not limited thereto. Four points obtained from the corner positions HV1 through HV4 or TLT1 through TLT4 may be used as the corner position as is.

(6-8) Furthermore, in the aforementioned embodiment a case is described in which the method for detecting the corner is applied to the video signal processing device 1 wherein a source video signal $V_{in}$ is inserted into the predetermined area of the video signal $V_{BK}$ to generate a synthesized video signal $V_{mix}$. However, the present invention is not limited thereto. The method of detecting the corner of the present invention may be applied to the detection of the position of parts based on image signals on lines in factories. In summary, the method for detecting the corner of the present invention can be applied in all fields such as the field of factory automation and the like.

As described above, according to the present invention, a point where the signal level becomes the reference signal level or more is detected by reading the input signal in horizontal and vertical direction, and at the same time the point where the signal level becomes the reference signal level or more is detected by reading the input signal in the diagonal direction at the determined angle, and the corner position is detected by detecting four points whose positions differ out of the detected points. Thus, each corner position of the detection object can be detected with a simple structure and quickly. In doing so, a corner detector and a method for detecting the corner wherein each corner position of the determined area can be detected from the input signal can be realized with a simple structure.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A corner detection device for detesting from a retrieval scope of an input signal each corner position of an area of a square configuration where a signal level is set to a level higher than a level of a reference signal level, the device comprising:

memory means for memorizing said input signal; and corner detection means for detecting a point where the signal level of said input signal is at first set to a level higher than the level of said reference signal by reading from said retrieval scope upper and lower limits in a horizontal direction sequentially the input signal which is memorized in said memory means, and at the same time reading from the retrieval scope left and right ends in a vertical direction sequentially, and detecting a point where the signal level of said input signal is at first set to a level higher than the level of said reference signal by reading the input signal memorized in said memory means in a diagonal direction sequentially at a predetermined angle from each angle, and detecting four points whose positions differ from the detected points.

2. The corner detection device according to claim 1, wherein said corner detection means examines distances between said detected points, and judges that the positions differ when the distances exceed a predetermined reference value.

3. The corner detection device according to claim 1, wherein said corner detection means judges whether or not the detected points are correct by selecting two points which form sides of the area out of said four points, and by examining whether the signal level only on one side is set to a level higher than the level of said reference signal out of both sides of a straight line connecting the two points.

4. The corner detection device according to claim 1, wherein said corner detection means detects a point which is set to a level higher than the reference signal level by reading in a horizontal direction and in a vertical direction followed by determining the second retrieval scope on the basis of the detected points and performs the reading in said diagonal direction in the second retrieval scope.

5. The corner detection device according to claim 1, wherein said corner detection means detects the diagonal line of said area from the detected points in a case in which the four points whose positions differ cannot be detected by reading in said horizontal direction and in said vertical direction as well as reading in said diagonal direction, the means detecting points which are not detected by reading in the diagonal direction at an angle of the diagonal line.

6. The corner detection device according to claim 5, wherein said corner detection means detects a third point which is not detected by reading in a diagonal direction at an angle of a straight line connecting two points which are detected in a case in which said diagonal line cannot be detected, the means detecting a fourth point which cannot be detected by detecting said diagonal line from the detected three points and reading in the diagonal direction at an angle of the diagonal line.

7. A corner detection method for detecting from a retrieval scope of an input signal each corner position of an area of a square configuration where a signal level is set to a level higher than a level of a reference signal level, the method comprising:

a memory step of memorizing said input signal in a predetermined memory means;

a first detection step of reading said input signal memorized in said memory means sequentially in a horizontal direction from an upper limit to a lower limit of said retrieval scope and detecting a point where the signal level of said input signal is set to a level higher than said reference signal level at first by reading sequentially in a vertical direction from the right end and the left end of said retrieval scope;

a second detection step of detecting a point where the signal level of said input signal is set to a level higher than the level of said reference signal level at first by reading said input signal which is memorized in said memory means sequentially in the diagonal direction at a predetermined angle from each angle of said retrieval scope; and a third detection step of detecting said corner position by detecting the four points whose positions differ from points detected in said first and second detection steps.

8. The corner detection method according to claim 7, wherein said third detection step examines a distance between the points which are detected in said first and second detection steps to judge that the positions differ when the distance exceeds a predetermined reference value.

9. The corner detection method according to claim 7, wherein said third detection step judges whether or not the detected points are correct by selecting two points which form sides of said area out of said detected four points, and by examining whether the signal level only on one side is set to a level higher than the level of said reference signal out of both sides of a straight line connecting the two points.

10. The corner detection method according to claim 7, wherein said first detection step detects a point which is set to a level higher than the level of the reference signal by reading in the horizontal direction and in the vertical direction followed by determining the second retrieval scope on the basis of the detected point while said second detection step performs reading in said diagonal direction in said second retrieval scope.

11. The corner detection method according to claim 7, wherein said third detection step detects the diagonal line of said area from the detected points in a case in which the four points whose positions differ cannot be detected by reading in said horizontal direction and in said vertical direction in said first detection step as well as reading in said diagonal direction in said second detection step, the step detecting the point which cannot be detected by reading in the diagonal direction at an angle of the diagonal line.

12. The corner detection method according to claim 11, wherein
said third detection step detects the third point which cannot be detected by reading in the diagonal direction at an angle of a straight line connecting the two points which are detected when said diagonal line cannot be detected, the step detecting the fourth points which cannot be detected in reading in the diagonal direction at an angle of the diagonal line by detecting said diagonal line from three points which are detected.

13. A video image processing device for synthesizing a second video image with a first video image, comprising:
coordinate detection means for detecting the coordinates of four corners of a rectangular area which is'set to said first video image by retrieving in plural directions, at least, in the horizontal direction, in the vertical direction and in the oblique direction, the all of pixels of said first video image;
three-dimensional conversion means for computing a three-dimensional conversion matrix used in a three-dimensional conversion processing performed on said second video image based on the coordinates of four corners which are detected by said coordinate detection means, and performing the three-dimensional conversion processing on said second video image using the computed three-dimensional conversion matrix so that the size of the rectangular area which is set to said first video image coincides with the size of the second video image which is three-dimensionally converted; and
synthesizing means for synthesizing said first video image with the second video image which is three-dimensionally converted by said three-dimensional conversion means.

14. The video image processing device according to claim 13, wherein
the rectangular area which is set to said first video image corresponds to an area which has a specified color of said first video image.

15. The video image processing device according to claim 14, further including,
key signal generation means for generating a first key signal corresponding to the rectangular area which is set to said first video image, said video image processing device wherein,
said synthesizing means synthesizes said first video image with said second video image which is three-dimensionally converted based on said first key signal.

16. The video image processing device according to claim 15, wherein
said three-dimensional conversion means further performs said three-dimensional conversion processing on the second key signal for keying said second video image.

17. The video image processing device according to claim 16, wherein
said three-dimensional conversion means has memory means for memorizing said second video image, and read address generation means for supplying a read address corresponding to said conversion matrix to said memory means.

18. The video image processing device according to claim 17, wherein
said read address generation means computes said read address based on the inverse matrix of said three-dimensional conversion matrix.

19. The video image processing device according to claim 18, wherein
said three-dimensional conversion matrix is shown by a matrix in three lines by three columns composed of eight conversion parameters as follows:

$$T'_{33} = \begin{pmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{pmatrix} \quad (68)$$

$$= \begin{pmatrix} a'_{11} & a'_{12} & a'_{13} \\ a'_{21} & a'_{22} & a'_{23} \\ a'_{31} & a'_{32} & 1 \end{pmatrix}$$

20. The video image processing device according to claim 19, wherein
said three-dimensional conversion means obtains eight parameter values of said three-dimensional conversion matrix utilizing that the following equation is satisfied:

$$[X_i \cdot K_i \quad Y_i \cdot K_i \quad K_i] = [X'_i \quad Y'_i \quad 1] \cdot T'_{33} \quad (69)$$

$$= [X'_i \quad Y'_i \quad 1] \cdot \begin{pmatrix} a'_{11} & a'_{12} & a'_{13} \\ a'_{21} & a'_{22} & a'_{23} \\ a'_{31} & a'_{32} & 1 \end{pmatrix}$$

where $(X_1, Y_1)$ $(X_2, Y_2)$ $(X_3, Y_3)$ $(X_4, Y_4)$ show the coordinates of four corners in the area set to the first video image,
$(X'_1, Y'_1)$ $(X'_2, Y'_2)$ $(X'_3, Y'_3)$ $(X'_4, Y'_4)$ show the coordinates of four corners of the second video image, and
$K_1, K_2, K_3, K_4$ show parameters in simultaneous coordinate system.

21. A video image processing method for synthesizing a second video image with a first video image, comprising the steps of:
detecting the coordinates of four corners of a rectangular area which is set to said first video image by retrieving in plural directions, at least, in the horizontal direction, in the vertical direction and in the oblique direction, the all of pixels of said first video image;
computing a three-dimensional conversion matrix used in a three-dimensional processing performed on said second video image based on the detected coordinates of the four corners,
performing the three-dimensional conversion processing on said second video image using the computed three-dimensional conversion matrix so that the size of the rectangular area set to said first video image coincides with the size of the second video image which is three-dimensionally converted; and
synthesizing said first video image with said second video image which is three-dimensionally converted.

* * * * *